(12) United States Patent
Walworth et al.

(10) Patent No.: US 10,473,134 B2
(45) Date of Patent: Nov. 12, 2019

(54) ENLARGED HEAD FASTENER DEVICE AND METHOD OF MANUFACTURE

(71) Applicant: SR SYSTEMS, LLC, Tuscaloosa, AL (US)

(72) Inventors: Van T. Walworth, Lebanon, TN (US); Steve Zimmerman, Linden, AL (US); Scott Drummond, Tuscaloosa, AL (US)

(73) Assignee: SR Systems, LLC, Tuscaloosa, AL (US)

( * ) Notice: Subject to any disclaimer, the term of this patent is extended or adjusted under 35 U.S.C. 154(b) by 249 days.

(21) Appl. No.: 15/100,168

(22) PCT Filed: Jun. 10, 2015

(86) PCT No.: PCT/US2015/035190
§ 371 (c)(1),
(2) Date: Aug. 22, 2016

(87) PCT Pub. No.: WO2015/191772
PCT Pub. Date: Dec. 17, 2015

(65) Prior Publication Data
US 2018/0172051 A1    Jun. 21, 2018

Related U.S. Application Data

(60) Provisional application No. 62/108,259, filed on Jan. 27, 2015, provisional application No. 62/010,163, filed on Jun. 10, 2014.

(51) Int. Cl.
*F16B 15/02*    (2006.01)
*F16B 35/06*    (2006.01)
(Continued)

(52) U.S. Cl.
CPC ............ *F16B 15/02* (2013.01); *B21K 1/46* (2013.01); *B21K 1/466* (2013.01); *B21K 1/48* (2013.01); *F16B 35/06* (2013.01)

(58) Field of Classification Search
CPC ............................................. F16B 15/20
(Continued)

(56) References Cited

U.S. PATENT DOCUMENTS 112,335 A    3/1871   Linsey
300,077 A  * 6/1884   Hyslop
(Continued)

FOREIGN PATENT DOCUMENTS

CN    2508041 Y    8/2002
DE    19506081 A1  8/1996
(Continued)

OTHER PUBLICATIONS

U.S. Appl. No. 14/735,920, filed Jun. 10, 2015, Scott Drummond.
(Continued)

*Primary Examiner* — Gary W Estremsky
(74) *Attorney, Agent, or Firm* — Harness, Dickey & Pierce, P.L.C.

(57) ABSTRACT

An enlarged head fastener device and method for manufacturing the same is described. The enlarged head fastener device includes a shank and a head. The head extends outwardly from the shank in a transverse plane to define a head periphery. The head has an anterior side and a posterior side. The anterior side includes a bearing surface and a convergent transition portion that reinforces the head. The convergent transition portion extends between a large end adjacent the bearing surface to a small end adjacent the shank. At least one ridge formation projects from the anterior side of the head providing additional reinforcement. The ridge formation extends continuously between an outboard end positioned on the anterior side of the head adjacent the head periphery and an inboard end positioned on the shank. The head may be centered or offset relative to the shank.

19 Claims, 20 Drawing Sheets

(51) Int. Cl.
  *B21K 1/46* (2006.01)
  *B21K 1/48* (2006.01)
(58) Field of Classification Search
  USPC .......... 411/439, 450, 451.1, 451.3, 455, 480, 411/481, 483, 484, 486, 923; D8/391
  See application file for complete search history.

(56) References Cited

U.S. PATENT DOCUMENTS

| | | | |
|---|---|---|---|
| 387,380 A | | 8/1888 | Thayer |
| 411,841 A | * | 10/1889 | Taylor |
| 1,620,193 A | | 3/1927 | Coates |
| 1,820,556 A | | 8/1931 | Campbell |
| 1,995,705 A | | 3/1935 | Deniston, Jr. |
| 2,032,099 A | | 2/1936 | Rosenberg |
| 2,093,610 A | | 9/1937 | Kraemer |
| 2,256,401 A | | 9/1941 | Maze |
| 2,557,370 A | * | 6/1951 | Bussmann ............. H01B 17/24 174/164 |
| 3,355,978 A | * | 12/1967 | Flintoft ................... F16B 15/06 411/480 |
| 3,478,638 A | * | 11/1969 | Thurner ................... B25C 1/18 411/441 |
| 4,002,098 A | * | 1/1977 | Colechia ................ F16B 15/02 206/343 |
| 4,726,164 A | | 2/1988 | Reinwall et al. |
| 4,802,802 A | * | 2/1989 | Thurner ............. E04F 13/0837 411/107 |
| 4,860,513 A | | 8/1989 | Whitman |
| 4,884,932 A | | 12/1989 | Meyer |
| 4,932,820 A | | 6/1990 | Schniedermeier |
| 5,031,262 A | | 7/1991 | Baritz |
| 5,039,262 A | | 8/1991 | Giannuzzi |
| 5,069,589 A | | 12/1991 | Lemke |
| 5,154,670 A | | 10/1992 | Sygnator et al. |
| 5,286,453 A | * | 2/1994 | Pope ................... A61B 10/0045 422/512 |
| 5,407,313 A | | 4/1995 | Bruins et al. |
| 5,492,452 A | * | 2/1996 | Kirsch ............... A61B 17/0642 411/455 |
| 5,516,248 A | | 5/1996 | DeHaitre |
| 5,569,010 A | * | 10/1996 | Janssen .................... B25C 1/18 411/441 |
| 5,622,464 A | | 4/1997 | Dill et al. |
| 6,352,398 B1 | * | 3/2002 | Gonnet .................. F16B 19/14 411/441 |
| 6,688,829 B1 | * | 2/2004 | Popovich ............... F16B 19/14 411/441 |
| 6,758,018 B2 | | 7/2004 | Sutt, Jr. |
| 7,374,384 B2 | | 5/2008 | Sutt, Jr. |
| 7,395,925 B2 | | 7/2008 | Sutt, Jr. |
| 7,818,940 B2 | | 10/2010 | Herb |
| 7,850,410 B1 | | 12/2010 | Curtis |
| 8,529,180 B1 | | 9/2013 | Sargis |
| 8,726,581 B2 | | 5/2014 | Zimmerman et al. |
| 8,794,893 B2 | | 8/2014 | Aihara et al. |
| 8,998,056 B2 | | 4/2015 | Huang et al. |
| 9,163,654 B2 | | 10/2015 | Barenski, Jr. et al. |
| 2003/0175093 A1 | | 9/2003 | Walther |
| 2004/0228705 A1 | | 11/2004 | Baer et al. |
| 2007/0204552 A1 | | 9/2007 | Onofrio |
| 2007/0224020 A1 | | 9/2007 | Hsieh et al. |
| 2010/0034618 A1 | * | 2/2010 | Foser ..................... E04G 17/00 411/441 |
| 2010/0172719 A1 | | 7/2010 | Maltais et al. |
| 2010/0183403 A1 | | 7/2010 | Ali et al. |
| 2010/0196122 A1 | | 8/2010 | Craven |
| 2010/0212244 A1 | * | 8/2010 | Yu ......................... E04F 13/045 52/363 |
| 2010/0224038 A1 | | 9/2010 | Evatt |
| 2012/0301249 A1 | * | 11/2012 | Jablonski .............. F16B 1/0071 411/394 |
| 2014/0076954 A1 | | 3/2014 | Miller et al. |

FOREIGN PATENT DOCUMENTS

| | | |
|---|---|---|
| DE | 19508454 A1 | 9/1996 |
| GB | 732203 A | 6/1955 |
| GB | 818246 | 8/1959 |
| GB | 947816 A | 1/1964 |
| GB | 1046456 A | 10/1966 |
| JP | 2001280318 A | 10/2001 |
| JP | 2001280324 A | 10/2001 |
| JP | 2004316761 A | 11/2004 |
| JP | 2006250231 A | 9/2006 |
| JP | 2010116949 A | 5/2010 |
| JP | 2011528772 A | 11/2011 |
| JP | D1437446 | 4/2012 |
| JP | D1473814 | 7/2013 |
| WO | WO-01-06135 A2 | 1/2001 |
| WO | WO-2006039412 A2 | 4/2006 |

OTHER PUBLICATIONS

U.S. Appl. No. 15/223,179, filed Jul. 29, 2016, Steve Zimmerman.
Notice of Third Party Submissions Under the Japanese Patent Law Enforcement Regulation 3-2 for JP 2016-572505, dated Dec. 11, 2017.
EP Supplementary Search Report and Written Opinion for EP 15806959.1, dated Jan. 4, 2018.
EP Supplementary Search Report and Written Opinion for EP 15805869.3, dated Jan. 4, 2018.
International Search Report for PCT/US2015/035190, dated Sep. 23, 2015.
Written Opinion of the International Searching Authority for PCT/US20105/035190, dated Sep. 23, 2015.
International Search Report for PCT/US2015/035188, dated Sep. 23, 2015.
Written Opinion of the International Searching Authority for PCT/US2015/035188 dated Sep. 23, 2015.
International Search Report and Written Opinion for PCT/US2016/044962, dated Nov. 8, 2016.
International Preliminary Report on Patentability for PCT/US2015/035188, dated Dec. 22, 2016.

* cited by examiner

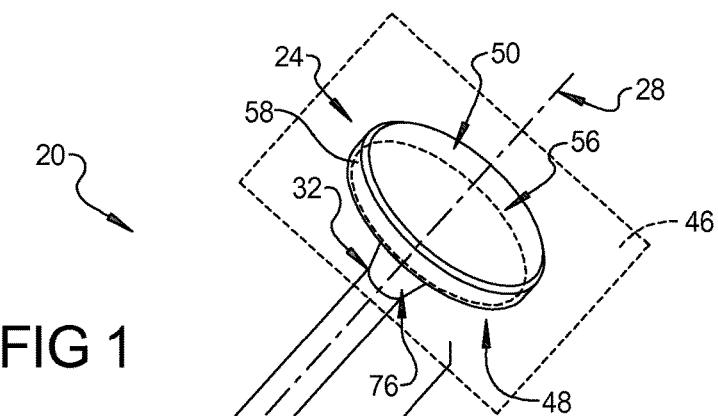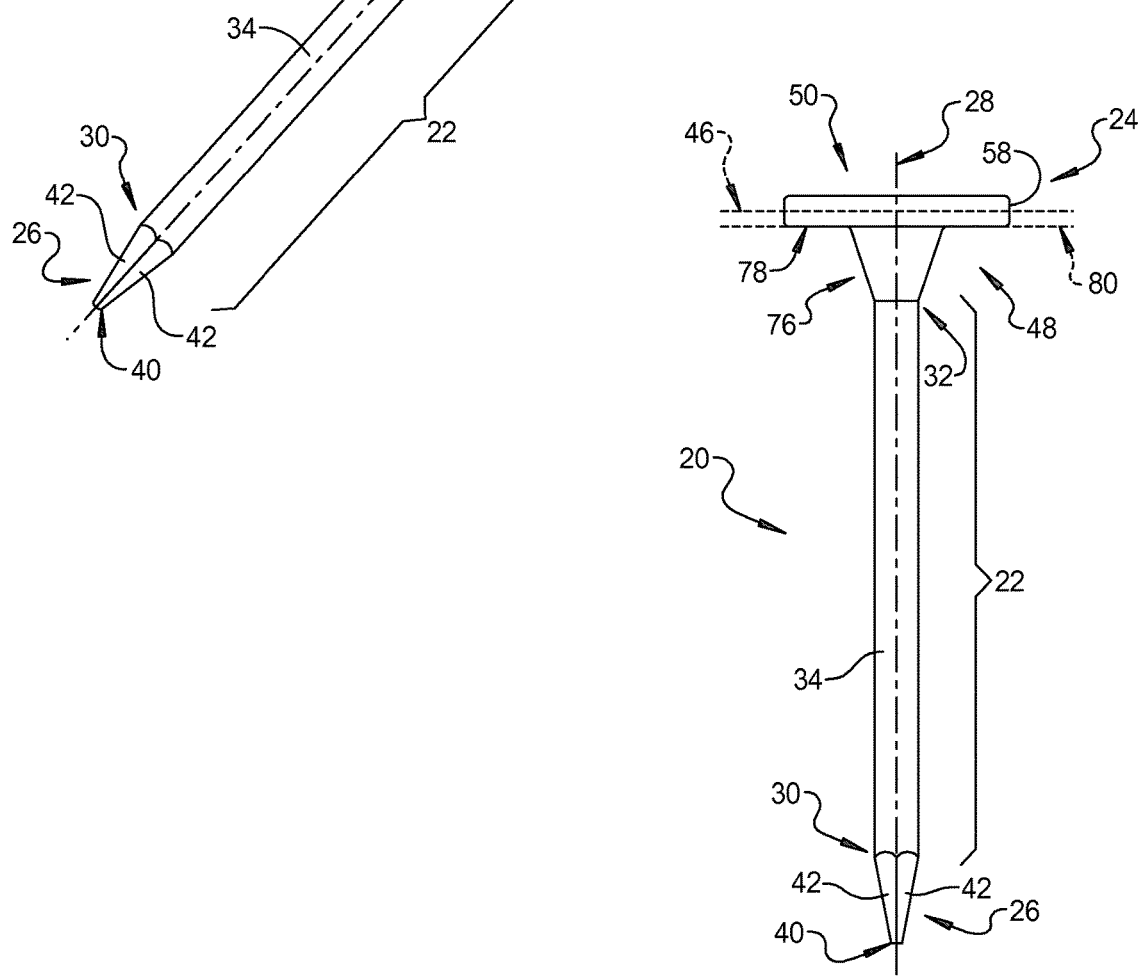

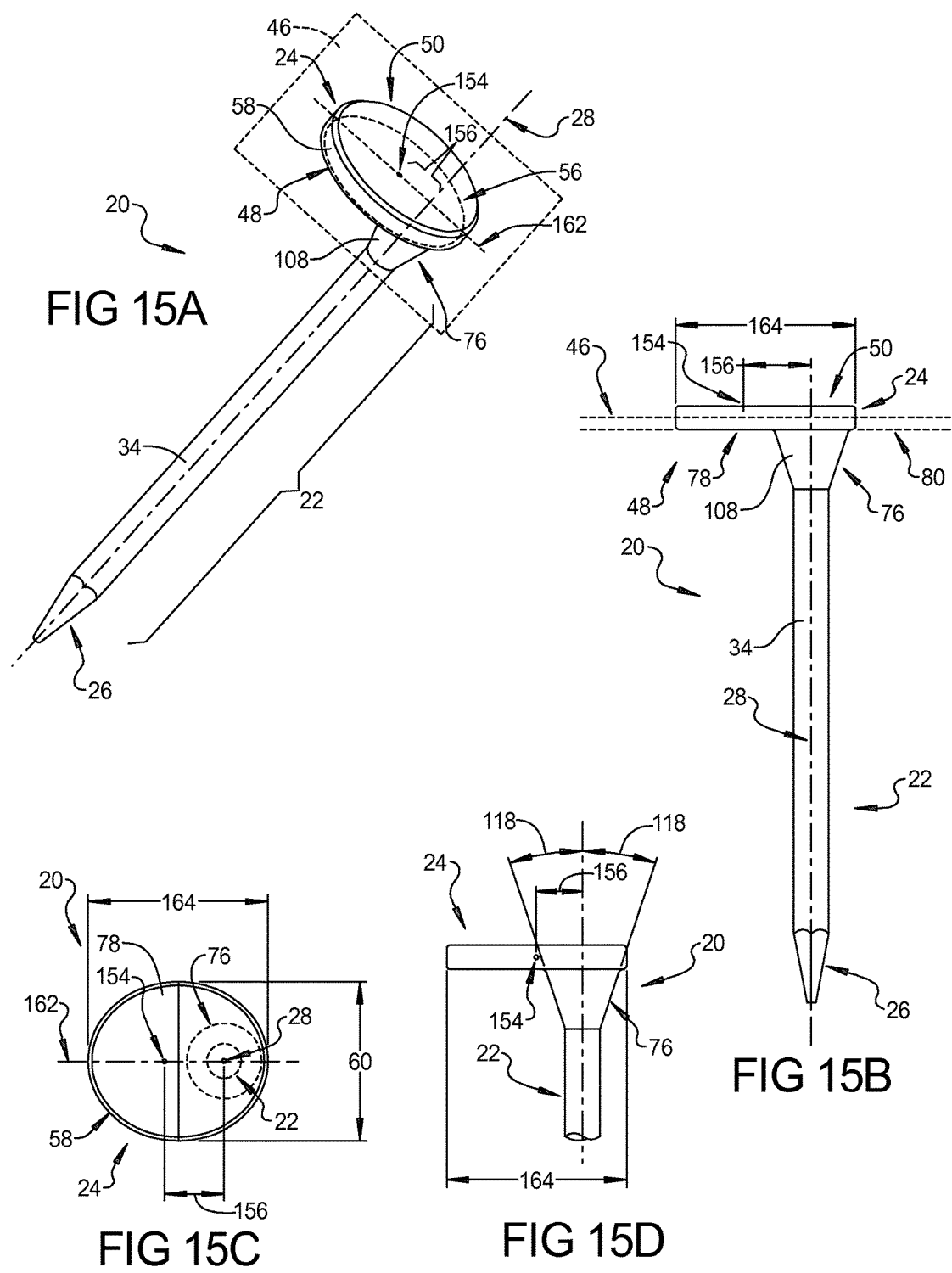

ENLARGED HEAD FASTENER DEVICE AND METHOD OF MANUFACTURE

CROSS REFERENCE TO RELATED APPLICATIONS

This application is a U.S. National Phase Application under 35 U.S.C. 371 of International Application No. PCT/US2015/035190 filed on Jun. 10, 2015 and published in English as WO 2015/191772 A1 on Dec. 17, 2015. This claims the benefit of U.S. Provisional Application No. 62/010,163, filed Jun. 10, 2014 and U.S. Provisional Application No. 62/108,259, filed Jan. 27, 2015. The present application is also related to U.S. application Ser. No. 14/735,920, filed Jun. 10, 2015. The entire disclosures of the above applications are incorporated herein by reference.

FIELD

The subject disclosure generally relates to fasteners and methods for their manufacture. By way of example and without limitation, such fasteners may be used in the construction industry for securing multiple building components to one another.

BACKGROUND

This section provides background information related to the present disclosure and is not necessarily prior art.

Nail-like fasteners have been used for thousands of years. Some archeological evidence suggests that nail-like fasteners may have been used in Mesopotamia as long ago as 3500 B.C. Early nails were forged or shaped with hammers. Several millennia later in the 1500s A.D. machines were developed to produce a "cut-nail" fastener from a strip of iron. Not until the mid-1800s were machines and methods developed to produce nail-like fasteners made from metal wire. Most nail-like fasteners of the present day are still produced by machines, methods, and techniques that utilize a metal wire forming process.

At the beginning of the American Revolution, England held the distinction of being the world's leading producer of nails. At that time, there was essentially no nail production taking place in the American Colonies on a commercial scale. As a result many Colonial households setup a simple nail manufacturing process in their homes using home fires as a manufacturing tool. Colonist made nails for their own use as well as for bartering for other goods and services. The first wide spread manufacture of wire nails in the USA was in 1877-1879 using iron wire from Norway. Wire nails had been used in Norway for many years prior to their introduction to the USA construction market. Testing as early as the year 1884, conducted by the Watertown Arsenal, in Watertown, Mass., revealed that cut-nails had superior withdrawal resistance compared to iron wire nails. However, because the wire nails could be produced at significantly lower cost than cut-nails, the construction industry gravitated to wire nails and away from cut-nails. Now, over 130 years later, there are over 2,000 varieties of nail-like fasteners being produced in modern times.

Nail-like fasteners are used for many purposes and are designed for use in many types of materials and/or applications. One application is in the wood frame construction industry, where nail-like fasteners are utilized to fasten wood and/or wood-like materials together. In general, the construction industry has many applications for residential and/or commercial structures using structural substrate components made of wood and/or wood-like materials. The wood and/or wood-like substrate materials receive fastener devices that are applied to restrain and/or couple the wood and/or wood-like substrate materials to one another and to other construction components. Typical fasteners such as nails, screws, and bolts generally include a longitudinally extending shank and a head that extends radially outwardly from the end of the shank.

Many standard nails are loose, which facilitate being driven by hand while many other nails are collated or coiled in some fashion to facilitate use with a powered delivery system. In a similar fashion, screws are available for application by hand and/or powered delivery systems. Typically, bolted fasteners are manually installed while final torque is either applied manually or with the assistance of a powered system. There are many features applied to the shanks of nails, screws, and bolts to assist the retention and holding strength of the fastener. Some features that have been applied to the shank of nail-like fasteners include special coatings, spiral twisting, ring shanks, knurls, barbs, ribs, and splines, just to name a few. Some nail-like and/or screw-like fasteners combine multiple shank features on the same shank. In similar fashion, screw-like and bolt-like shanks feature many different kinds of thread patterns, continuous threads, discontinuous threads, single flutes, multiple flutes, special coatings, and combinations of thread patterns on the same shank, just to name a few. Even though many variations exist, the heads of most fasteners used in residential and commercial construction to connect and/or restrain wood and/or wood like materials are relatively small in size. Furthermore, the heads of most typical fasteners are designed and manufactured in such a way that they cut and/or rupture surface fibers of the substrate material.

When a typical fastener is installed in a typical wood and/or wood-like substrate material, a tug-a-war of sorts results between the substrate material and the fastener. For instance, a typical plywood roof decking substrate material of a typical wood frame construction is fastened to a wood rafter framing substrate material using a nail. In many regions near coastal areas prone to high wind storms, building codes require at least an 8d nail applied in a prescribed pattern and spacing in order to achieve a safe working load design. The tug-a-war in this scenario plays out during a high wind storm as the roof decking substrate material is challenged to come off and separate from the wood rafter framing substrate material. Effectively, the only thing holding the roof decking substrate material together with the wood rafter substrate material are the nails. The nail shanks are challenged to not withdraw from the wood rafter substrate material while at the same time the nail head is challenged to not pull-through the roof decking substrate material.

The weakest link in the pull-through withdrawal tug-of-war will fail first such that one of three failure modes results. In the first failure mode, the nail shank will withdraw from the wood rafter substrate material so that the nail head remains embedded in the roof decking substrate material (i.e. the roof decking substrate material lifts off the wood rafter substrate material taking the nails with it.) In the second failure mode, the nail head will pull-through the roof decking substrate material and the nail shank will remain embedded in the wood rafter substrate (i.e. the roof decking substrate material lifts off the wood rafter substrate material while the nails remain in the wood rafter substrate material). A third failure mode, less common than the first and second failure modes, is fastener failure, where the nail head or the shank fails due to breakage, bending, or shearing. When any one of these three failure modes occur, the wood roof decking substrate material comes off resulting in the building suffering extensive damage and property loss.

Independent third party lab testing conducted by NTA, Inc. has demonstrated that commonly used nails lose as much as half of their initial withdrawal resistance within two days of being driven in place. Then after about a month later, the wood fibers of the substrate material will cooperate with the nail to slightly increase its withdrawal resistance, though the final withdrawal resistance will still be significantly less than the initial resistance.

Shank features such as barbs, ring shanks, spirals, and flutes have been shown to lose significant withdrawal resistance when the substrate material is subjected to environmental conditions, which causes the dry shrinking of wood substrate fibers over long periods of time. In addition, shank features such as barbs, ring shanks, spirals, and flutes have been shown to lose significant withdrawal resistance when the nail and substrate material are subjected to vibration, which may be created by storm winds beating upon a structure, seismic activity generated by tornadoes beating the ground as they travel, and seismic activity associated with earth quakes and ground shifting.

Examples of nail-like fasteners include those disclosed in U.S. Pat. No. 387,380 entitled "Flat Pointed Nail or Tack," which issued to J. F. Thayer on Aug. 7, 1888, U.S. Pat. No. 2,093,610 entitled "Nail," which issued to S. Kraemer on Sep. 21, 1937, and U.S. Pat. No. 4,932,820 entitled "Nail With Differential Holding Capabilities Along Its Shank," which issued to Schniedermeier on Jun. 12, 1990. One short coming of the fasteners described in these patents is that the heads can easily cut and/or rupture the surface fibers of the wood and/or wood-like substrate material. Another significant shortcoming of fasteners of this type is that the pull-through resistance of the fastener does not increase proportionally with an increase in the thickness of the substrate material. Independent third party testing by NTA, Inc. reveals that as the thickness of the substrate material increases, the pull-through resistance of such fasteners increases to a lesser extent.

Some people in the construction industry have improvised and resorted to using a flat washer under the head of the fastener to enlarge the effective bearing surface of the fastener. While using a washer-type device does increase the bearing surface, it also increases the relative thickness of the head of the fastener causing it to protrude above the surface of the substrate material. If the fastener and washer combination is driven in to be flush with the surface of the substrate material, then the substrate material can often be cut, compromised, and/or damaged such that it is easily susceptible to further deformation and subsequent loss of structural integrity.

Examples of nail-like fasteners used in combination with a washer-like device include U.S. Pat. No. 2,256,401 entitled "Fastener," which issued to H. Maze on Sep. 16, 1941, U.S. Pat. No. 4,860,513 entitled "Roofing Fastener," which issued to Whitman on Aug. 29, 1989, and U.S. Pat. No. 4,884,932 entitled "Decking Insulation Fastener," which issued to Meyer on Dec. 5, 1989. A short coming of the fasteners disclosed in these patents includes that the washer-like devices are not designed to prevent cutting and/or rupturing the surface fibers of the wood and/or wood-like material substrate. Similar to the way a nail head ruptures the surface fibers of the wood substrate, the washer-like device does so as well, but at a larger diameter than the nail head diameter.

Others have developed nails with enlarged heads to increase the effective bearing surface of the fastener. For example, U.S. Pat. No. 6,758,018 entitled "Power Driven Nails For Sheathing Having Enlarged Diameter Heads For Enhanced Retention And Method," which issued to Sutt, Jr. on Jul. 6, 2004, discloses a fastener with an enlarged head requiring a specific ratio between the size of the head and the size of the shank. The enlarged head specified by this ratio results in increased pull-through resistance compared to commonly used nails. Fasteners available in the marketplace under the brand name "Hurriquake" are a derivative of this patent. Testing reveals that fasteners of this type do exhibit increased pull-through resistance compared to fasteners having a smaller tradition sized head. However, one of the shortcomings of this design is that the geometric features of the nail head are relatively flat and planar, with sharp edges along the underside of the head. The benefit of the enlarged head size compared to the shank of the fastener is limited because of the inherent detrimental benefits of the geometric shape of the head design. Specifically, enlarged head nails have been shown to include several significant failure modes. One failure mode occurs where the surface fibers of the wood substrate material become ruptured and split from the initial setting of the nail before pull-through forces are applied due to the sharp edges on the underside of the head. Another failure mode occurs where the enlarged heads of the nails become noticeably distorted and wobbled after pulling through the substrate material, resembling an umbrella turned inside out as a result of strong winds. Yet another significant shortcoming observed in the testing was that the corresponding pull-through resistance of the nails tested in various thicknesses of substrates materials was not equivalent to the increased thickness of the substrate. In other words, in spite of the enlarged head, independent third party testing reveals that as the thickness of the substrate material increases, there is not a corresponding increase in the pull-through resistance for nails of this design. Another disadvantage associated with such enlarged head fasteners lies with the manufacturing process for such fasteners. After the metal wire forming the shank of the fastener has been clamped by opposing die halves, multiple hammer strikes are required in order to form the enlarged head of the fastener due to its size. In other words, the diameter of the head after a first hammer strike is insufficient and one or more additional hammer strikes are required to continue to push the material of the wire outward to form the enlarged head. This increases manufacturing costs by slowing down the yield of the manufacturing process.

Accordingly, there remains a need for an improved fastener head design that increases pull-through resistance of nail-like fasteners, screw-like fasteners, and bolt-like fasteners.

SUMMARY

This section provides a general summary of the disclosure, and is not a comprehensive disclosure of its full scope or all of its features.

In accordance with one aspect of the subject disclosure, an enlarged head fastener device comprising a shank and a head is provided. The shank extends along a shank axis between a first end and a second end. The shank has an exterior surface that extends between the first end and the second end and the shank has a shank cross-section that is perpendicular to the shank axis. The shank cross-section has a circular shape and a shank diameter. The head is disposed at the second end of the shank and extends outwardly from the second end of the shank in a transverse plane to define a head periphery. The transverse plane is substantially perpendicular to the shank axis. The head has an anterior side that is located adjacent the second end of the shank and a posterior side opposite the anterior side. The anterior side of the head includes a bearing surface that extends inwardly from an outer radius edge to an inner radius edge in a first direction. The outer radius edge is location adjacent the head periphery and the first direction is substantially parallel to the transverse plane. The anterior side of the head also includes a convergent transition portion that extends inwardly from a large end to a small end. The large end of the convergent transition portion is located adjacent the inner radius edge of the bearing surface and the small end of the convergent transition portion is located adjacent the second end of the shank. The large end of the convergent transition portion has a circular shape and a large end diameter. The large end diameter is 1.25 to 2.05 times larger than the shank diameter such that the convergent transition portion reinforces the head without interfering with the installation of the enlarged head fastener device.

In accordance with another aspect of the subject disclosure, the enlarged head fastener device includes at least one ridge formation that is disposed on and that projects from the anterior side of the head. The at least one ridge formation extends continuously between an outboard end and an inboard end. The outboard end of the at least one ridge formation is positioned on the anterior side of the head at a location adjacent the head periphery. Meanwhile, the inboard end of the at least one ridge formation is closer to the second end of the shank than the outboard end of the at least one ridge formation. Advantageously, the at least one ridge formation provides additional reinforcement to the head.

In accordance with yet another aspect, the subject disclosure provides a method of manufacturing the enlarged head fastener device described herein. The method includes the step of arranging at least two forming dies in an opposing relationship. Each of the at least two forming dies includes a first die end, a second die end, and a mating surface that extends between the first and second die ends. The mating surfaces of the at least two forming dies oppose one another. The method also includes the steps of arranging a hammer die adjacent the first die ends of the at least two forming dies and providing in each of the at least two forming dies a head forming cavity, a convergent transition portion forming cavity, and a shank forming cavity. More specifically, the head forming cavities are provided along the first die ends, the convergent transition portion forming cavities are provided adjacent the head forming cavities, and the shank forming cavities are provided along the mating surfaces of the at least two forming dies between the convergent transition portion forming cavities and the second die ends. The method further includes the steps of extending a metal wire between the mating surfaces of the at least two forming dies from the second die ends toward the first die ends until an end of the metal wire protrudes from the first die ends and closing the at least two forming dies on the metal wire. In accordance with the closing step, the metal wire is received in the head forming cavity, the convergent transition portion forming cavity, and the shank forming cavity of each of the at least two forming dies. The method additionally includes the steps of hammering the end of the metal wire protruding from the first die ends in a single impact and forcing material from the metal wire to flow out into and fill the head forming cavity and the convergent transition portion forming cavity of each of the at least two forming dies. The single impact in the hammering step occurs between the end of the metal wire and the hammer die when the hammer die is translated (i.e. moved or driven) towards the first die ends of the at least two forming dies. In accordance with the method, the forcing step forms a head and a convergent transition portion of an enlarged head fastener device in response to the hammering step.

Accordingly, the fastener devices described herein and the method for its manufacture provide a number of advantages and overcome the short comings of existing fasteners and associated methods for their production. The fastener head design described herein provides substantially improved retention capabilities combined with superior pull-through resistance compared to small-head fasteners and existing enlarged head fasteners. Both convergent transition portion and the at least one ridge formation reinforce the head of the subject enlarged head fastener device in order to substantially eliminate the failure mode that occurs in other fasteners where the enlarged head is turned inside out like an umbrella after pulling through the substrate material. Because the head of the subject enlarged head fastener device is much less prone to deformation, the pull-through resistance of the disclosed enlarged head fastener device is higher. In addition, the pull-through resistance of the disclosed enlarged head fastener device increases to a greater extent when the thickness of the substrate material is increased. Testing has shown that this level of fastener performance is not achieved by the small-head fasteners or the other enlarged head fasteners described above. Advantageously, the teachings set forth herein can be applied to a wide range of different fastener types, including nail-like fasteners, screw-like fasteners, and bolt-like fasteners.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 1 is a side perspective view of an exemplary enlarged head fastener device constructed in accordance with the subject disclosure;

FIG. 2 is a side elevation view of the exemplary enlarged head fastener device illustrated in FIG. 1;

FIG. 15A is a side perspective view of another exemplary enlarged head fastener device constructed in accordance with the subject disclosure that includes an offset head;

FIG. 15B is a side elevation view of the exemplary enlarged head fastener device illustrated in FIG. 15A;

FIG. 15C is a top elevation view of the exemplary enlarged head fastener device illustrated in FIG. 15A looking down at the offset head;

FIG. 15D is a side elevation view of a portion of the exemplary enlarged head fastener device illustrated in FIG. 15A;

DETAILED DESCRIPTION

Figure 3A:
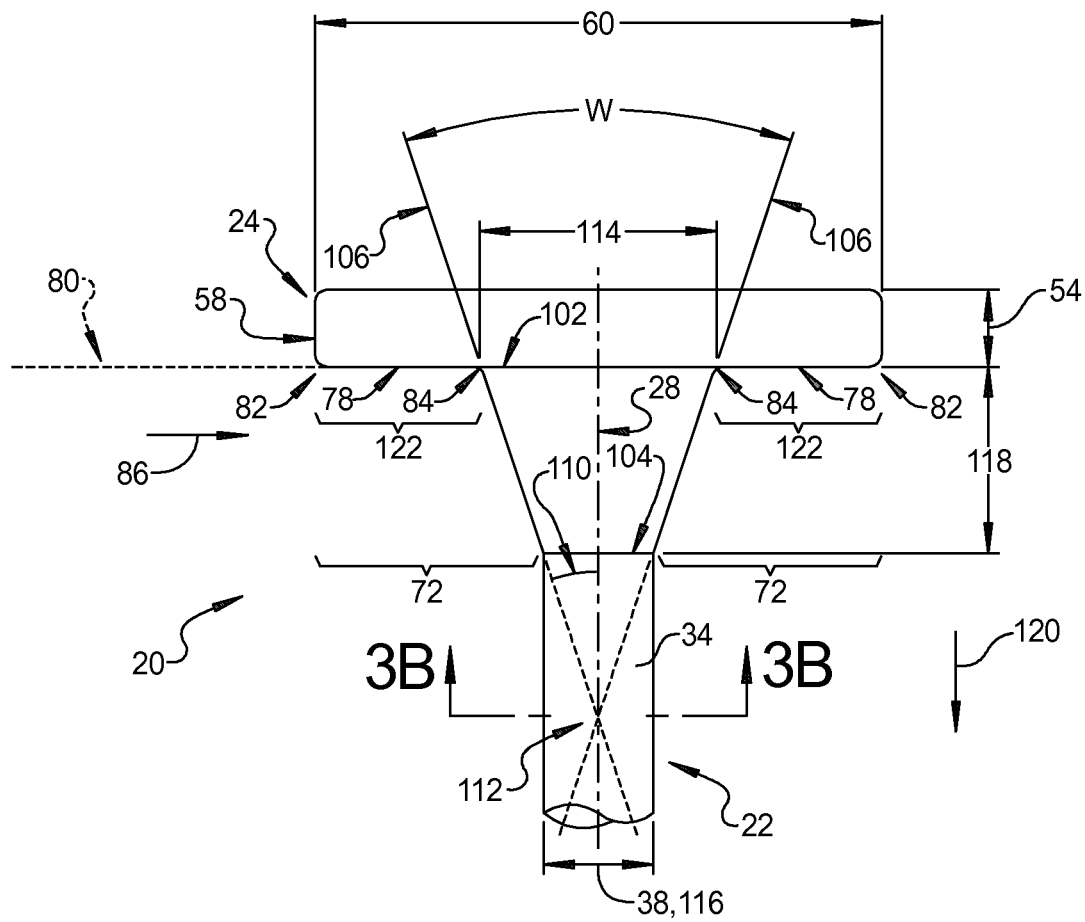
FIG. 3A is a side elevation view of a portion of the exemplary enlarged head fastener device illustrated in FIG. 1.

Referring to the Figures, wherein like numerals indicate corresponding parts throughout the several views, an enlarged head fastener device 20 is illustrated.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly. The term "substantially parallel," as used herein, means that the recited elements are exactly parallel or are arranged at an angle ranging between and including plus or minus 5 degrees. The term "substantially perpendicular," as used herein, means that the recited elements are arranged at an angle ranging between and including 85 degrees and 95 degrees.

Figure 3B:
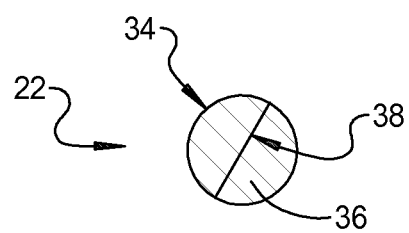
FIG. 3B is a top cross-sectional view of the exemplary enlarged head fastener device illustrated in FIG. 3A taken along line 3B-3B.

With reference to FIGS. 1, 2, 3A, and 3B, the enlarged head fastener device 20 is illustrated in the form of a nail-like arrangement. The enlarged head fastener device 20 includes a shank 22, a head 24, and a tip 26. It should be appreciated that in the examples illustrated, the shank 22, the tip 26, and the head 24 are integral with one another forming a one-piece structure. The shank 22 extends linearly along a shank axis 28 and between a first end 30 and a second end 32. The shank 22 has an exterior surface 34 that generally extends between the first and second ends 30, 32. Although other shapes are possible, in the examples shown, the exterior surface 34 of the shank 22 has a cylindrical shape. As best seen in FIG. 3B, the shank 22 has a shank cross-section 36 that has a circular shape and a shank diameter 38. It should be appreciated that the shank cross-section 36 extends perpendicularly relative to the shank axis 28.

The tip 26 is disposed at the first end 30 of the shank 22. Although a wide variety of different tip configurations may be utilized, in the examples illustrated, the tip 26 tapers from the shank diameter 38 at a location disposed adjacent the first end 30 of the shank 22 to a point 40 at a location that is spaced outwardly from the first end 30. The tip 26 has at least two angled sides 42. It should be appreciated that in FIGS. 1 and 2, only half of the tip 26 is visible and that the examples illustrated therein include a total of four angled sides 42. The angled sides 42 converge at the point 40 and each of the angled sides 42 is planar in shape. As such, the point 40 of the tip 26 may be disposed along the shank axis 28 (i.e. may be centered relative to the shank cross-section 36). In alternative configurations, the tip 26 may have a conical shape or may have only one angled side (not shown). Where the tip 26 includes only one angled side, the point 40 may be laterally offset relative to the shank axis 28 (not shown). It should also be appreciated that the shank 22 of the enlarged head fastener device 20 may be provided without a tip 26, where the shank 22 terminates at the first end 30.

The head 24 is disposed at the second end 32 of the shank 22. Accordingly, the head 24 is positioned on the shank 22 opposite the tip 26. The head 24 extends outwardly from the second end 32 of the shank 22 in a transverse plane 46 that is substantially perpendicular to the shank axis 28. In example illustrated in FIGS. 1, 2, 3A, and 3B, the head 24 is centered about the shank axis 28; however, other arrangements are possible where the head 24 is offset relative to the shank axis 28 (FIGS. 23A-23D). It should be appreciated that while the head 24 generally extends outwardly in the transverse plane 46, the head 24 is not necessary planar. Instead, the transverse plane 46 is arranged relative to the head 24 such that the transverse plane 46 bisects the head 24. The head 24 has an anterior side 48 adjacent the second end 32 of the shank 22 and a posterior side 50 opposite the anterior side 48. The head 24 has a head thickness 54 extending parallel to the shank axis 28 between the anterior and posterior sides 48, 50 of the head 24. As shown in FIG. 1, the head 24 has a head cross-section 56 that extends perpendicularly relative to the shank axis 28 and the head cross-section 56 is bounded by a head periphery 58. The head cross-section 56 has a circular shape in the examples shown in FIGS. 1, 2, 3A, and 3B. However, the head 24 may be formed in various different shapes and sizes. By way of example and without limitation, the head cross-section 56 may alternatively have the shape of an oval, a triangle, a square, a rectangle, a hexagon, or an octagon. The head periphery 58 defines a head width 60 that is larger than the shank diameter 38. Where the head cross-section 56 has a circular shape, the head width 60 equals a diameter of the head 24. The head periphery 58 generally extends between the anterior and posterior sides 48, 50 of the head 24 in a direction that is substantially parallel to the shank axis 28. In the examples illustrated in FIGS. 1, 2, 3A, and 3B, the head periphery 58 has a cylindrical shape. Notwithstanding these examples, the head periphery 58 may have a shape other than that of a cylinder.

The posterior side 50 of the head 24 may have a variety of different shapes. For example and without limitation, the posterior side 50 of the head 24 may have a planar shape or a domed shape. The posterior side 50 of the head 24 may be configured to be driven by a tool (not shown). Where the enlarged head fastener device 20 is provided in the nail-like arrangement, as illustrated in the figures, the tool may be, for example, a hammer. Generally, such a hammer may be swung into contact with the posterior side 50 of the head 24 in order to drive the tip 26 and subsequently the shank 22 into a substrate material 66 (shown in FIG. 14). Where the enlarged head fastener device 20 is provided in the screw-like arrangement, the tool maybe, for example, a screw driver. Accordingly, the head 24 of the enlarged head fastener device 20 may include a tool receiving recess (not shown), which may generally extend into the head 24 from the posterior side 50 toward the second end 32 of the shank 22. The geometric shape of the tool receiving recess is configured to receive part of the tool such that the enlarged head fastener device 20 may be rotationally driven by the tool. By way of example and without limitation, the tool receiving recess may be configured to receive a flat head tool portion, a Phillips head tool portion, a Torx head tool portion, or a hex head tool portion, a square head tool portion, a Pozidriv head tool portion, a Polydrive head tool portion, or other like variants. Where the enlarged head fastener device 20 is provided as in the screw-like arrangement, the compression indentation fastener device 20 may further include threads (not shown) that extends outwardly from the exterior surface 34 of the shank 22 for engagement with the substrate material 66 (shown in FIG. 14). The threads are configured to cut into the substrate material 66 as the tool rotates the head 24 and the shank 22, moving the shank 22 longitudinally relative to the substrate material 66 along the shank axis 28.

Where the enlarged head fastener device 20 is in the form of a bolt-like enlarged head fastener device 20, the enlarged head fastener device 20 may or may not be provided with a tip 26. The head 24 may include at least one planar tool contact surface (not shown). The at least one planar tool contact surface has a size and shape that is configured to mate with the tool. By way of example and without limitation, the tool may be a wrench or a socket and the head 24 may include a total of six planar tool contact surfaces, although any number of planar tool contact surfaces may be provided. In accordance with this configuration, the enlarged head fastener device 20 may include a nut (not shown) that threadably engages the first end 30 of the shank 22. The nut may also include one or more planar tool contact surfaces.

The anterior side 48 of the head 24 includes an exposed area 72 that is outward of the shank 22. The exposed area 72 is thus configured for contact with a first surface 74 (shown in FIG. 14) of the substrate material 66. The anterior side 48 of the head 24 includes a convergent transition portion 76 disposed between the shank 22 and the head periphery 58. The convergent transition portion 76 extends continuously about the second end 32 of the shank 22 without interruption. In the examples illustrated in FIGS. 1, 2, 3A, and 3B, where the shank cross-section 38 is circular, the convergent transition portion 76 circumscribes the second end 32 of the shank 22. The convergent transition portion 76 is spaced inward of the head periphery 58 to define a bearing surface 78. Accordingly, the bearing surface 78 is disposed between the convergent transition portion 76 and the head periphery 58. As such, the bearing surface 78 is located within the exposed area 72 on the anterior side 48 of the head 24. Due to its location within the exposed area 72, the bearing surface 78 is configured for contact with the first surface 74 of the substrate material 66. Although other geometries are possible, the bearing surface 78 illustrated in FIGS. 1, 2, 3A, and 3B has a planar, ring-like shape.

The bearing surface 78 defines a reference plane 80 that is substantially parallel to the transverse plane 46 and that is substantially perpendicular to the shank axis 28. In configurations where the bearing surface 78 is planar and perpendicular to the shank axis 28, the reference plane 80 extends along the bearing surface 78. In configurations where the bearing surface 78 is non-planar and/or is not perpendicular to the shank axis 28, the reference plane 80 is tangential to the bearing surface 78. In other words, the reference plane 80 touches the bearing surface 78 at points that are most distant from the posterior side 50 (i.e. points that are closest to the first end 30 of the shank 22). Depending on the geometry of the head 24, the reference plane 80, as defined by the bearing surface 78, may be spaced from the transverse plane 46 or may be co-extensive with the transverse plane 46.

As best seen in FIG. 3A, the bearing surface 78 extends between an outer radius edge 82 and an inner radius edge 84. The outer radius edge 82 is disposed between the bearing surface 78 and the head periphery 58 meanwhile the inner radius edge 84 is disposed between the bearing surface 78 and the convergent transition portion 76. The outer radius edge 82 and the inner radius edge 84 provide round, gradual transitions between the head periphery 58, the bearing surface 78, and the convergent transition portion 76. In particular, the outer radius edge 82 helps prevent surface fibers at the first surface 74 of the substrate material 66 from becoming cut as the bearing surface 78 is driven into the substrate material 66. Moving sequentially in a first direction 86 that extends along the bearing surface 78 and that points radially inwardly towards the shank axis 28, the head periphery 58, the outer radius edge 82, the bearing surface 78, the inner radius edge 84, the convergent transition portion 76, and the exterior surface 34 of the shank 22 are concentrically arranged in the example shown in FIGS. 1, 2, 3A, and 3B.

The convergent transition portion 76 extends between a large end 102 and a small end 104 to define a convergent transition portion reference line 106. The large end 102 of the convergent transition portion 76 is disposed adjacent the inner radius edge 84 of the bearing surface 78 and the small end 104 is disposed along the second end 32 of the shank 22. The convergent transition portion 76 has an outer surface 108 that extends between the large end 102 and the small end 104. The convergent transition portion reference line 106 intersects the shank axis 28 at an angle 110 and at a location 112 that is disposed between the first and second ends 30, 32 of the shank 22. The angle 110 that is formed between the convergent transition portion reference line 106 and the shank axis 28 ranges from 12.5 degrees to 32.5 degrees. As a result, the outer surface 108 of the convergent transition portion 76 in FIGS. 1, 2, 3A, and 3B has a frustoconical shape. It should be appreciated that angle 110 is measured relative to the shank axis 28. The convergent transition portion 76 is symmetrical about the shank axis 28. Therefore, angle 110 represents half of angle W, which is measure between one side of the convergent transition portion 76 and an opposite side of the convergent transition portion 76. Accordingly, when angle 110 ranges from 12.5 degrees to 32.5 degrees, angle W ranges from 25 degrees to 65 degrees. Testing has revealed that it is critical for angle 110 to fall within the 12.5 to 32.5 degree range. When angle 110 is less than 12.5 degrees, the convergent transition portion 76 does not displace enough substrate material 66 to consistently center the head 24 relative to a hole H (shown in FIG. 14) formed in the substrate material 66 by the tip 26 and the shank 22. When angle 110 is greater than 32.5 degrees, the convergent transition portion 76 displaces too much substrate material 66 to consistently center the head 24 relative to the hole H. Also, the convergent transition portion 76 displaces too much substrate material 66 making it difficult to drive the head 24 into the substrate material 66 to a position where the posterior side 50 is flush with the first surface 74 of the substrate material 66.

Still referring to FIGS. 1, 2, 3A, and 3B, the large end 102 of the convergent transition portion 76 has a circular shape and a large end diameter 114. Similarly, the small end 104 of the convergent transition portion 76 has a circular shape and a small end diameter 116. The large end diameter 114 is larger than the small end diameter 116 and the small end diameter 116 is equal to the shank diameter 38. Testing has shown that it is critical for the large end diameter 114 to be 1.25 to 2.05 times larger than the shank diameter 38 (and thus the small end diameter 116). When the large end diameter 114 is less than 1.25 times larger than the shank diameter 38, then the head 24 is more prone to snap off when the enlarged head fastener device 20 is subjected to destructive separation pull-through forces, such as during high wind storms. When the large end diameter 114 is more than 2.05 times larger than the shank diameter 38, then the convergent transition portion 76 displaces too much substrate material 66 to consistently center the head 24 relative to the hole H and it becomes difficult to drive the head 24 into the substrate material 66 to a position where the posterior side 50 is flush with the first surface 74 of the substrate material 66.

The convergent transition portion 76 also has an axial length 118 that is measurable between the large end 102 and the small end 104 of the convergent transition portion 76 along a second direction 120 that is parallel to the shank axis 28. Testing has shown that it is critical for the axial length 118 to be 0.55 to 1.75 times larger than the shank diameter 38. When the axial length 118 is less than 0.55 times larger than the shank diameter 38, then the head 24 is more prone to snap off when the enlarged head fastener device 20 is subjected to destructive separation pull-through forces, such as during high wind storms. When the axial length 118 is more than 1.75 times larger than the shank diameter 38, then the convergent transition portion 76 displaces too much substrate material 66 to consistently center the head 24 relative to the hole H and it becomes difficult to drive the head 24 into the substrate material 66 to a position where the posterior side 50 is flush with the first surface 74 of the substrate material 66.

As best seen in FIG. 3A, the bearing surface 78 has a bearing surface area 122 that is bounded by said outer radius edge 82 and said inner radius edge 84. Testing has shown that it is critical for the bearing surface area 122 to be at least 9 times larger than the shank cross-section 36. If the bearing surface area 122 is less than 9 times larger than the shank cross-section 36, then the bearing surface 78 can apply excessive compressive load bearing pressure on the substrate material 66, which can cause the head 24 to pull through the substrate material 66.

Figure 4:
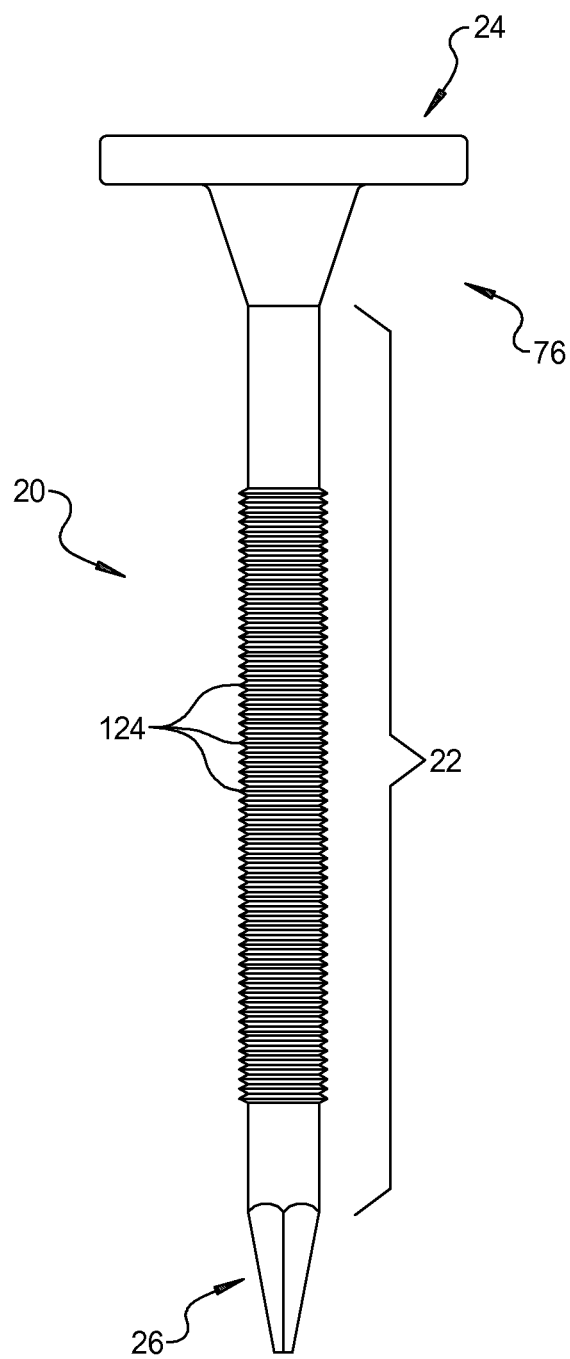
FIG. 4 is a side elevation view of another exemplary enlarged head fastener device constructed in accordance with the subject disclosure that includes a ribbed shank.
Figure 5A:
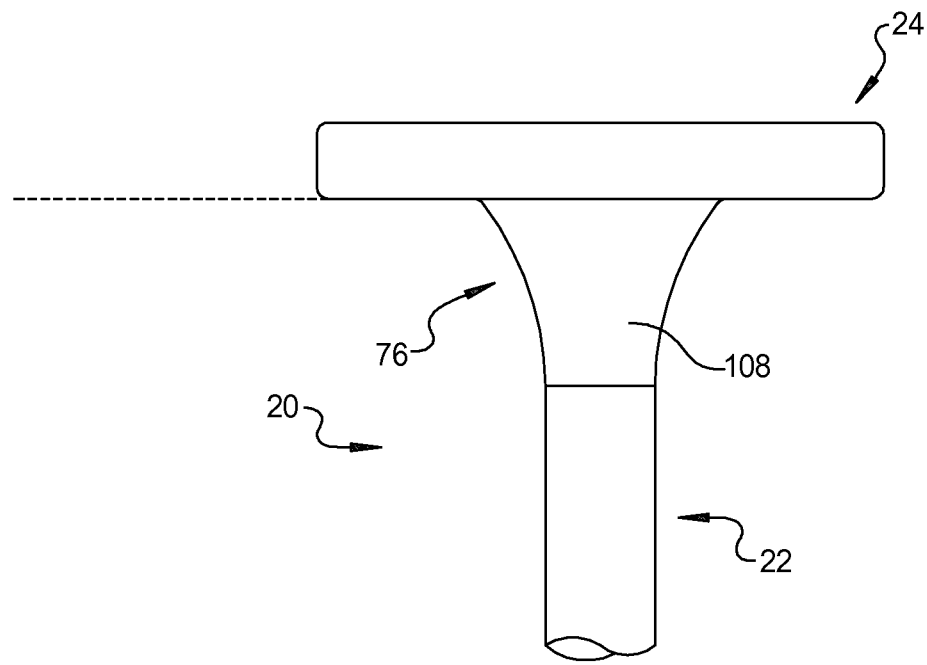
FIG. 5A is s side elevation view of a portion of another exemplary enlarged head fastener device constructed in accordance with the subject disclosure that includes a convergent transition portion having a curved outer surface.
Figure 5B:
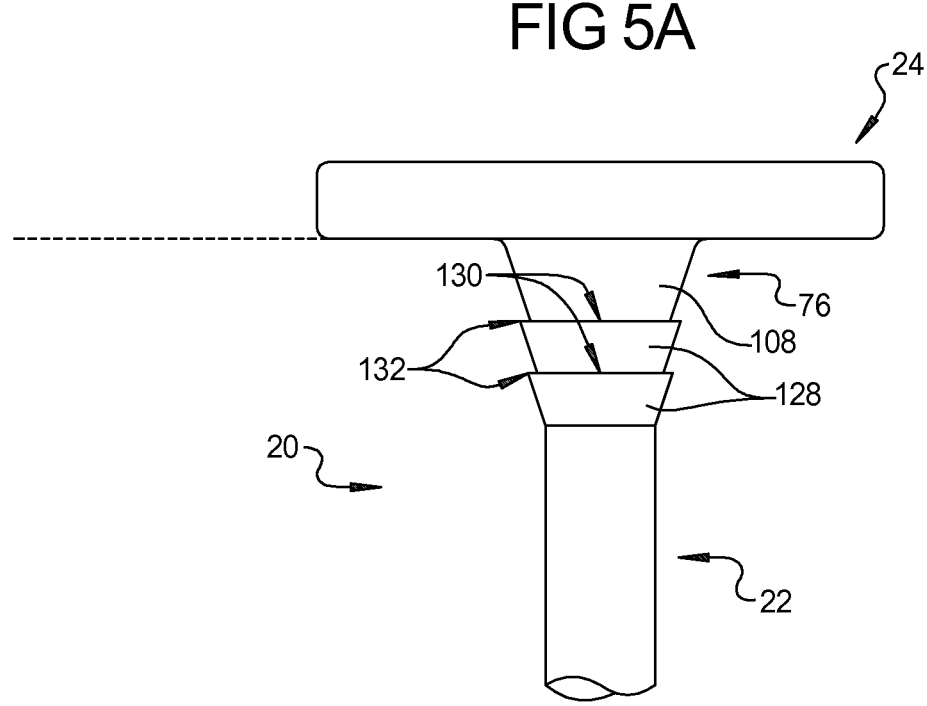
FIG. 5B is a side elevation view of a portion of another exemplary enlarged head fastener device constructed in accordance with the subject disclosure that includes a convergent transition portion with one or more teeth.
Figure 6:
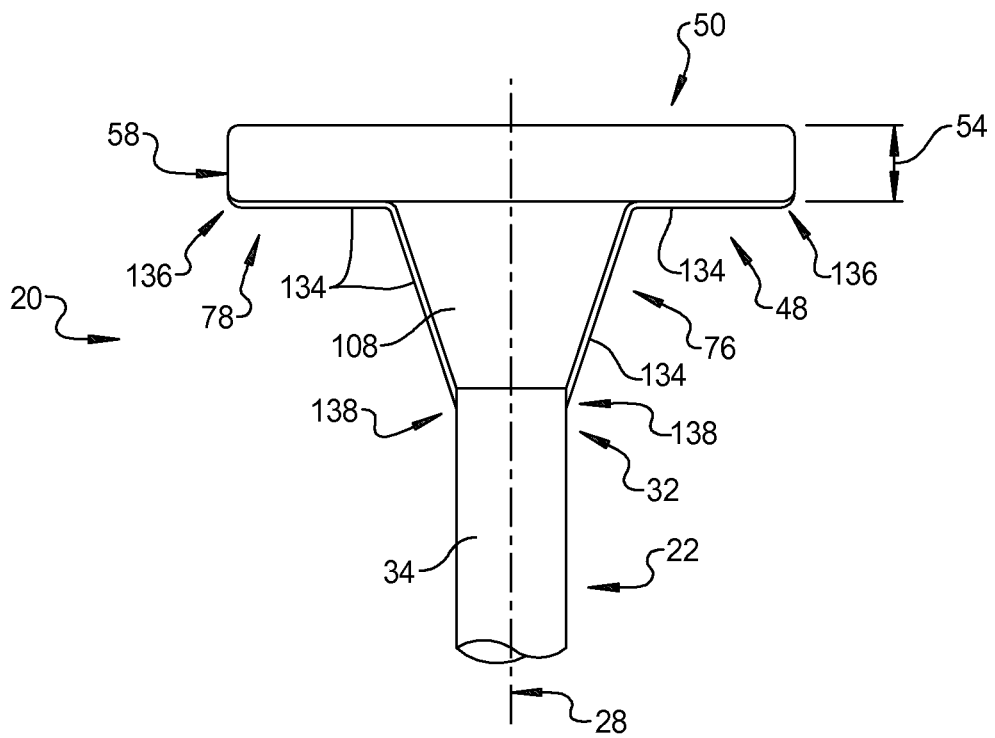
FIG. 6 is a side elevation view of a portion of another exemplary enlarged head fastener device constructed in accordance with the subject disclosure that includes a head with ridge formations disposed on an anterior side of the head.
Figure 7:
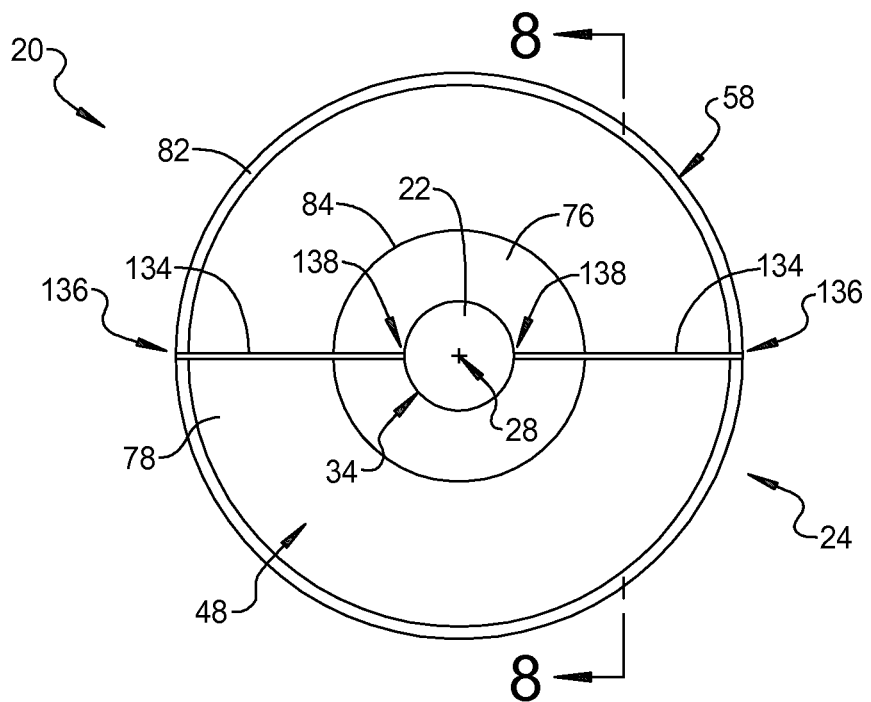
FIG. 7 is a bottom elevation view of the portion of the exemplary enlarged head fastener device illustrated in FIG. 6.
Figure 8:
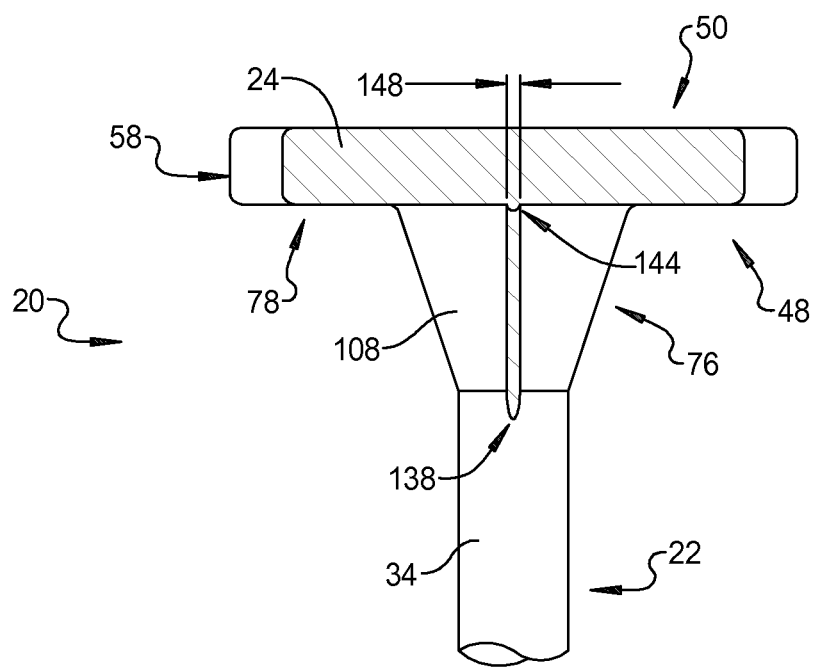
FIG. 8 is a side cross-sectional view of the portion of the exemplary enlarged head fastener device illustrated in FIG. 7 taken along line 8-8.
Figure 9:
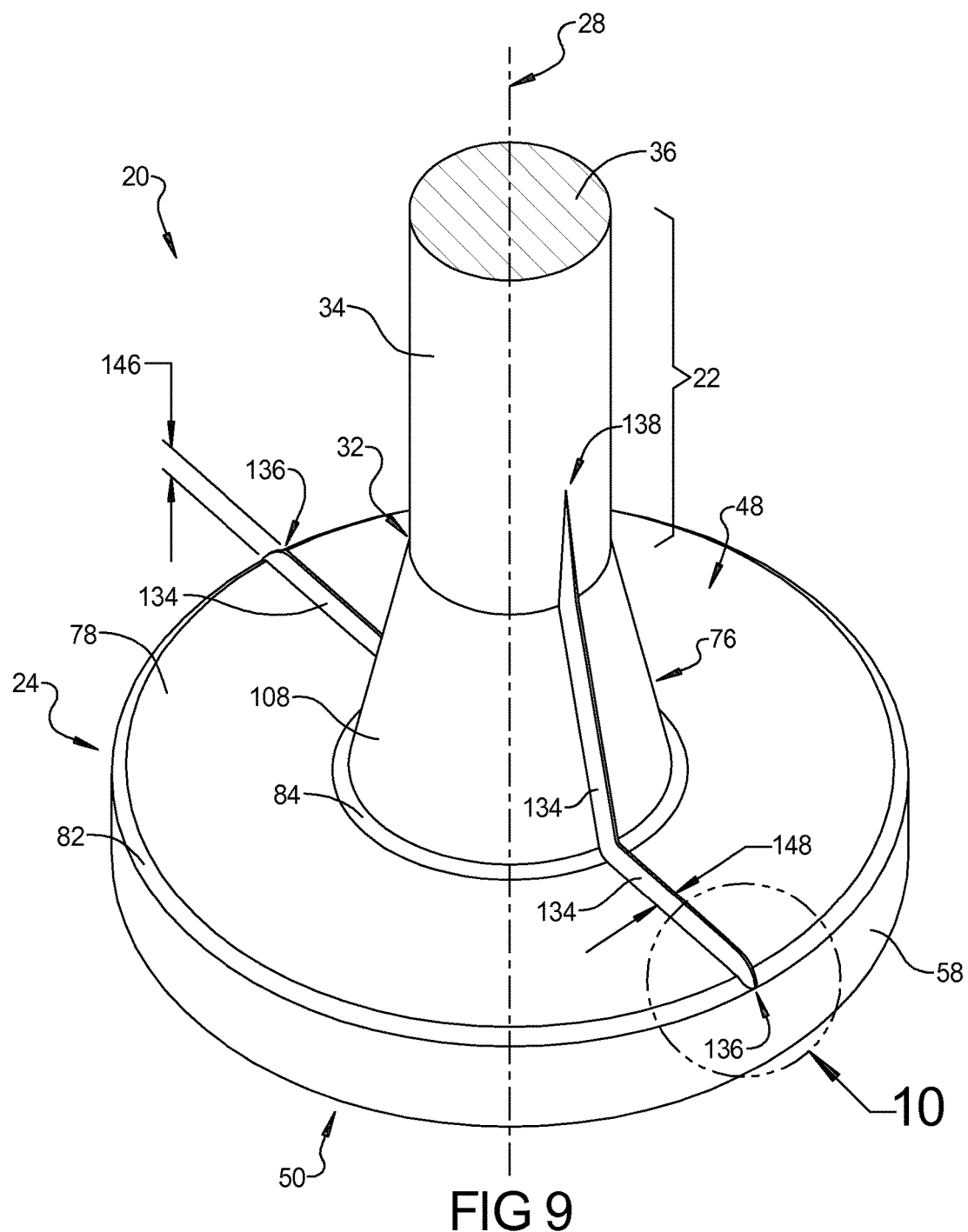
FIG. 9 is a bottom perspective view of the portion of the exemplary enlarged head fastener device illustrated in FIG. 6.
Figure 10:
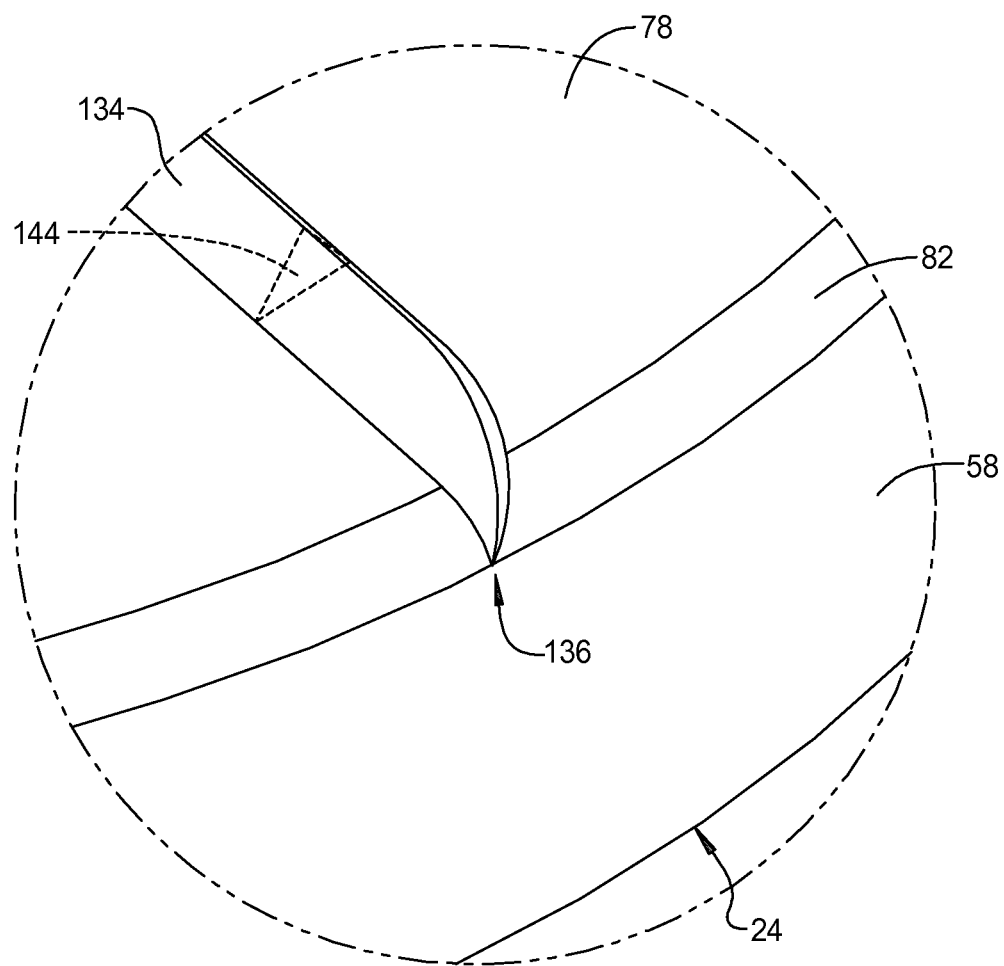
FIG. 10 is an enlarged bottom perspective view of a portion of the exemplary enlarged head fastener device illustrated in FIG. 9 showing one of the ridge formations.
Figure 11:
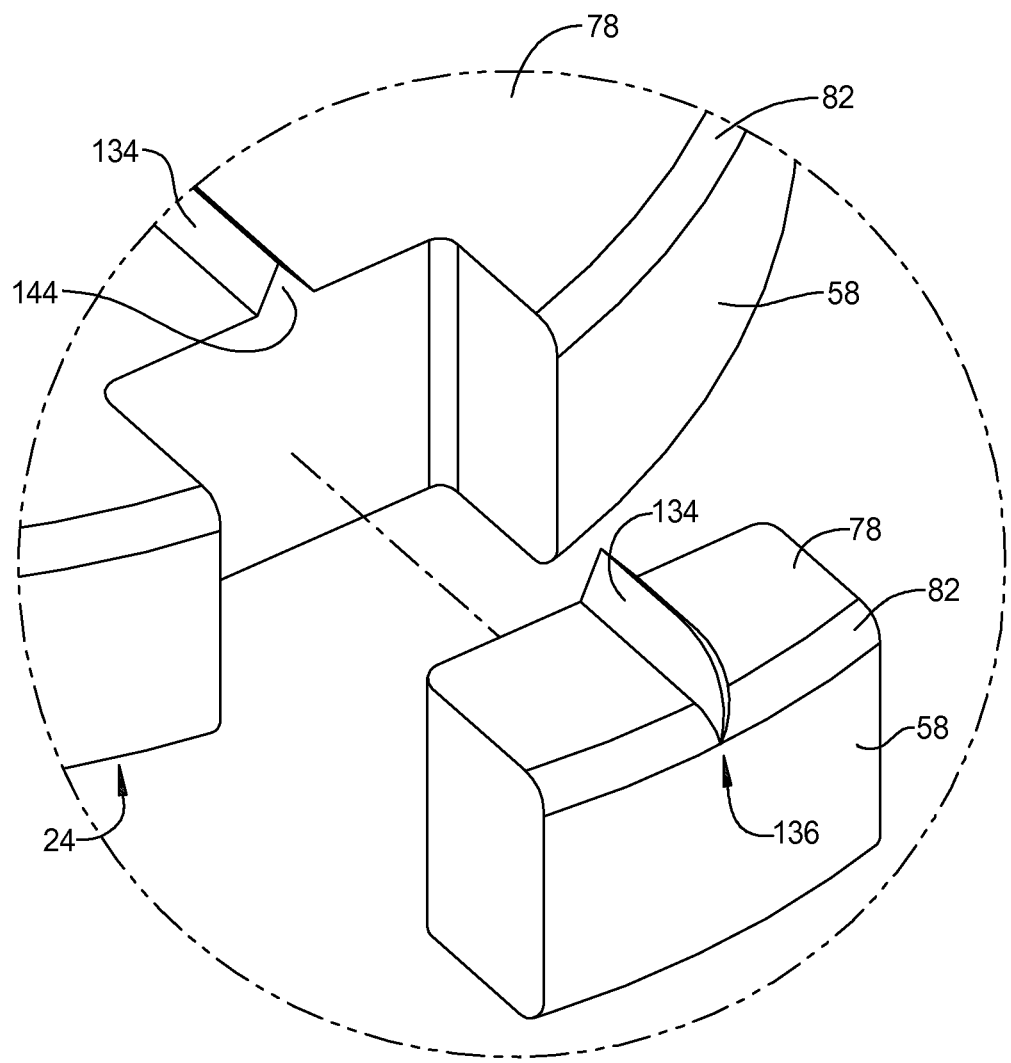
FIG. 11 is another enlarged bottom perspective view of a portion of the exemplary enlarged head fastener device illustrated in FIG. 9 where a cut-out has been made in the head to illustrate the shape of one of the ridge formations.
Figure 12:
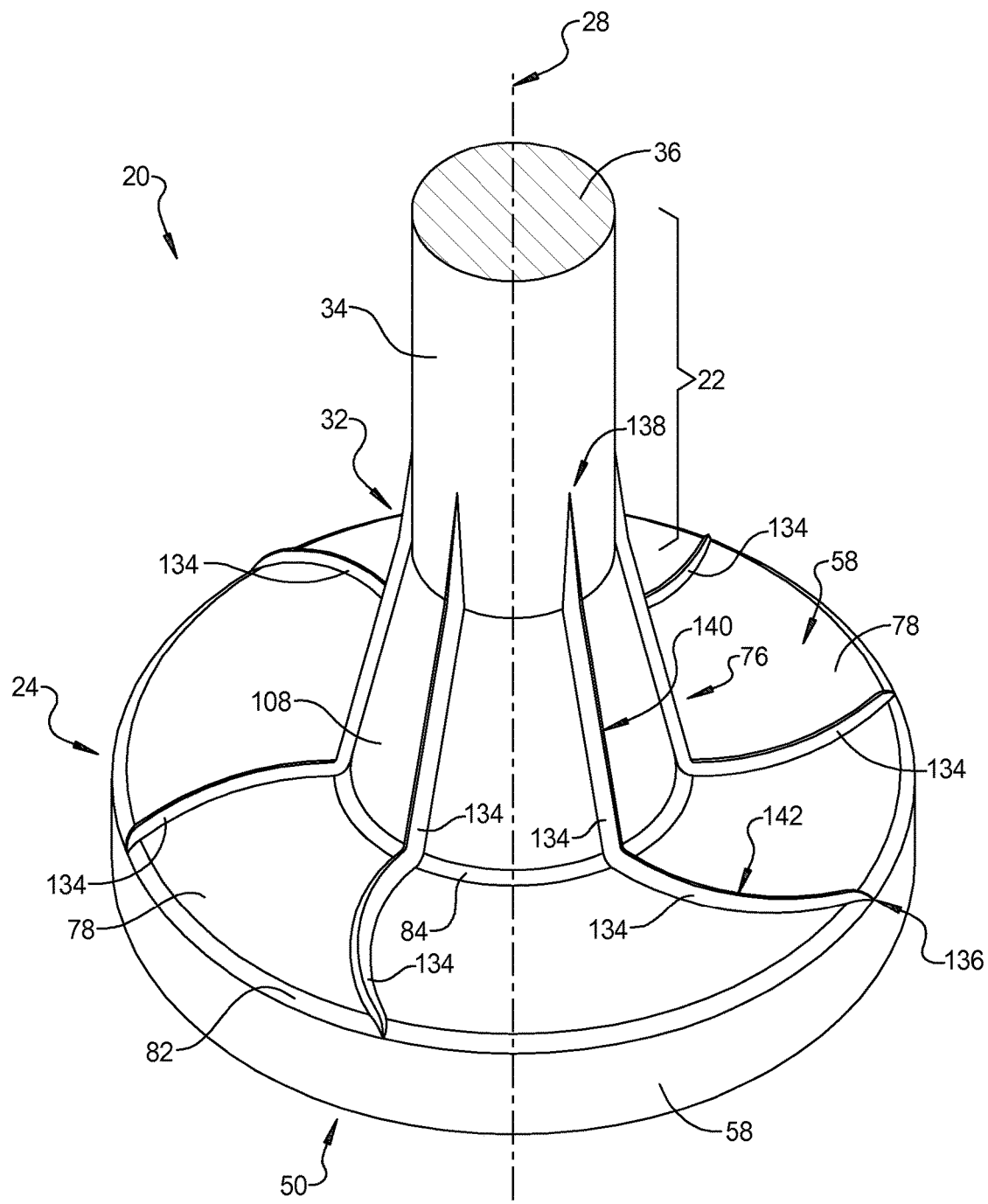
FIG. 12 is a bottom perspective view of a portion of another exemplary enlarged head fastener device constructed in accordance with the subject disclosure that includes a head with ridge formations that are curved across a bearing surface of the head.
Figure 13:
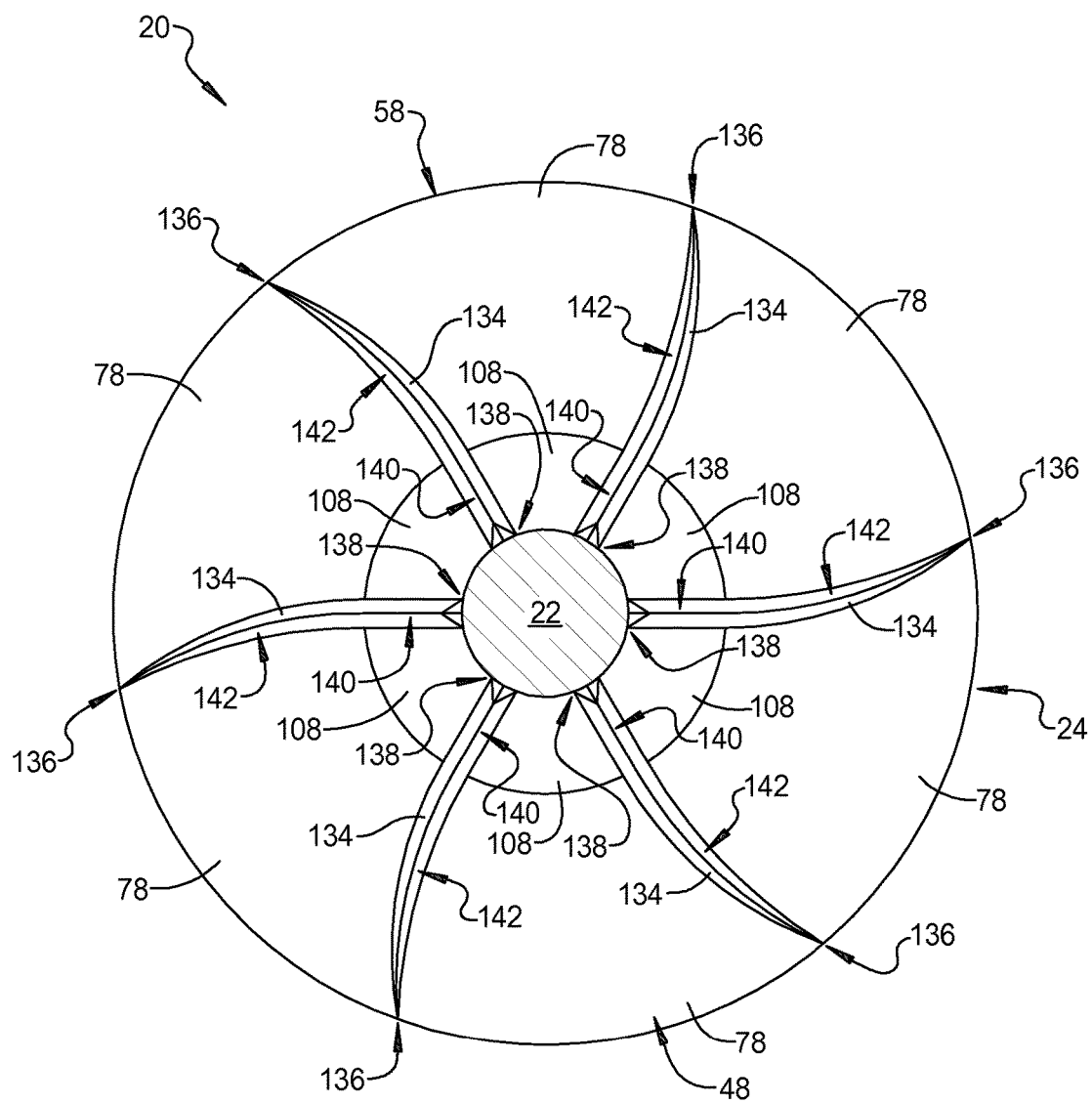
FIG. 13 is a bottom elevation view of the exemplary enlarged head fastener device illustrated in FIG. 12.

With reference to FIGS. 4, 5A, and 5B, variations of the enlarged head fastener device 20 are shown where the exterior surface 34 of the shank 22 and the outer surface 108 of the convergent transition portion 76 have been modified. FIG. 4 illustrates the enlarged head fastener device 20 of the subject disclosure where the shank 22 is provided with optional retention features 124 in the form of annular ribs that extend about and protrude from the exterior surface 34 of the shank 22. The retention features 124 engage the substrate material 66 adjacent the hole H to more securely anchor the shank 22 to the substrate material 66. In FIG. 5A, the outer surface 108 of the convergent transition portion 76 is curved moving from the large end 102 to the small end 104 of convergent transition portion 76. Accordingly, the convergent transition portion 76 is shaped like a parabolic frustum. In FIG. 5B, the outer surface 108 of the convergent transition portion 76 may include one or more teeth 128 that are provided for engagement with the substrate material 66. Each of the one or more teeth 128 may have an annular shape and an outside diameter 130. The outside diameters 130 of the one or more teeth 128 may increase moving from the small end 104 of the convergent transition portion 76 to the large end 102 of the convergent transition portion 76 such that the convergent transition portion 76 gets progressively wider moving from the small end 104 of the convergent transition portion 76 to the large end 102 of the convergent transition portion 76. Each of the one or more teeth 128 may have ramp-like profile that tapers to a sharp edge 132. The sharp edge 132 is configured to bite into the hole H in the substrate material 66 to help retain the enlarged head fastener device 20 in the hole H and prevent the enlarged head fastener device 20 from backing out of the substrate material 66. In accordance with this configuration, the convergent transition portion reference line 106 generally intersects the sharp edge 132 of each of the one or more teeth 128. The one or more teeth 128 may extend along all or part of the outer surface 108 of the convergent transition portion 76 and thus may be disposed above, below, or above and below the reference plane 80 of the bearing surface 78. Apart from the above noted distinctions, the construction of the enlarged head fastener device 20 shown in FIGS. 4, 5A, and 5B is largely the same as the enlarged head fastener device 20 shown in FIGS. 1, 2, 3A, and 3B.

With reference to FIGS. 6-13, other variations of the enlarged head fastener device 20 are shown where the bearing surface 78, the outer surface 108 of the convergent transition portion 76, and the exterior surface 34 of the shank 22 have been modified. As shown throughout the several views, one or more ridge formations 134 are disposed on and project from the anterior side 48 of the head 24. Each one of the ridge formations 134 extends continuously between an outboard end 136 that is positioned on the anterior side 48 of the head 24 at a location that is adjacent the head periphery 58 and an inboard end 138 that is positioned on the exterior surface 34 of the shank 22 at a location that is adjacent the second end 32 of the shank 22. Accordingly, each one of the ridge formations 134 extends along part of the exterior surface 34 of the shank 22, across the outer surface 108 of the convergent transition portion 76, and across the bearing surface 78 and to the head periphery 58. Where the enlarged head fastener device 20 is positioned with the shank axis 28 extending vertically (FIG. 6), the ridge formations 134 generally project downwardly from the bearing surface 78 and radially outwardly from the outer surface 108 of the convergent transition portion 76.

The ridge formations 134 may have a variety of different shapes. In the configuration shown in FIGS. 6-11, the ridge formations 134 extend linearly across the anterior side 48 of the head 24 between the second end 32 of the shank 22 and the head periphery 58. By contrast, in FIGS. 12 and 13, the ridge formations 134 extend across the outer surface 108 of the convergent transition portion 76 in a straight line 140 between the large end 102 and the small end 104 of the convergent transition portion 76 while the ridge formations 134 extend across the bearing surface 78 in a curved line 142 between the inner radius edge 84 and the outer radius edge 82. This results in the ridge formations 134 forming a spiral-like pattern across the bearing surface 78. Each of the ridge formations 134 also has a cross-sectional profile 144, a ridge height 146, and a ridge width 148. In the configuration shown in FIGS. 6-8, each of the ridge formations 134 is a round reinforcement rib where the cross-sectional profile 144 has a semi-circular or rounded shape. In the configuration shown in FIGS. 9-11, each of the ridge formations 134 is a peaked reinforcement rib where the cross-sectional profile 144 has a triangular shape.

As shown in FIGS. 6-13, the enlarged head fastener device 20 may include multiple ridge formations 134 that are evenly spaced about the anterior side 48 of the head 24. In the configuration shown in FIGS. 6-11, the enlarged head fastener device 20 includes two ridge formations 134 that are disposed 180 degrees apart from one another relative to the shank axis 28. In the configuration shown in FIGS. 12 and 13, the enlarged head fastener device 20 includes six ridge formations 134 that are disposed 60 degrees apart from one another relative to the shank axis 28. The ridge formations 134 reinforce the head 24 of the enlarged head fastener device 20 by resisting head deformation and preventing the head 24 from inverting when the enlarged head fastener device 20 is subjected to destructive pull-through forces. Accordingly, the head thickness 54 may actually be reduced while at the same time improving the structural integrity of the head 24. The ridge formations 134 therefore can be used to provide thinner head thicknesses 54 than would otherwise be possible without the ridge formations 134. The presence of the ridge formations 134 also hinders the ability of surface fibers in the substrate material 66 to slip past one another by forming concentrated lines of high compression 150 along the first surface 74 of the substrate material 66. These concentrated lines of high compression 150 in the substrate material 66 are positioned in the substrate material 66 underneath the ridge formations 134 and constrain surface fibers disposed in the substrate material 66 at locations adjacent the concentrated lines of high compression 150 from slipping past one another in a pull-through scenario. Thus, the ridge formations 134 increase the pull-through resistance of the enlarged head fastener device 20 in a number of different ways. Apart from the above noted distinctions, the construction of the enlarged head fastener device 20 shown in FIGS. 6-13 is largely the same as the enlarged head fastener device 20 shown in FIGS. 1, 2, 3A, and 3B.

Figure 14:
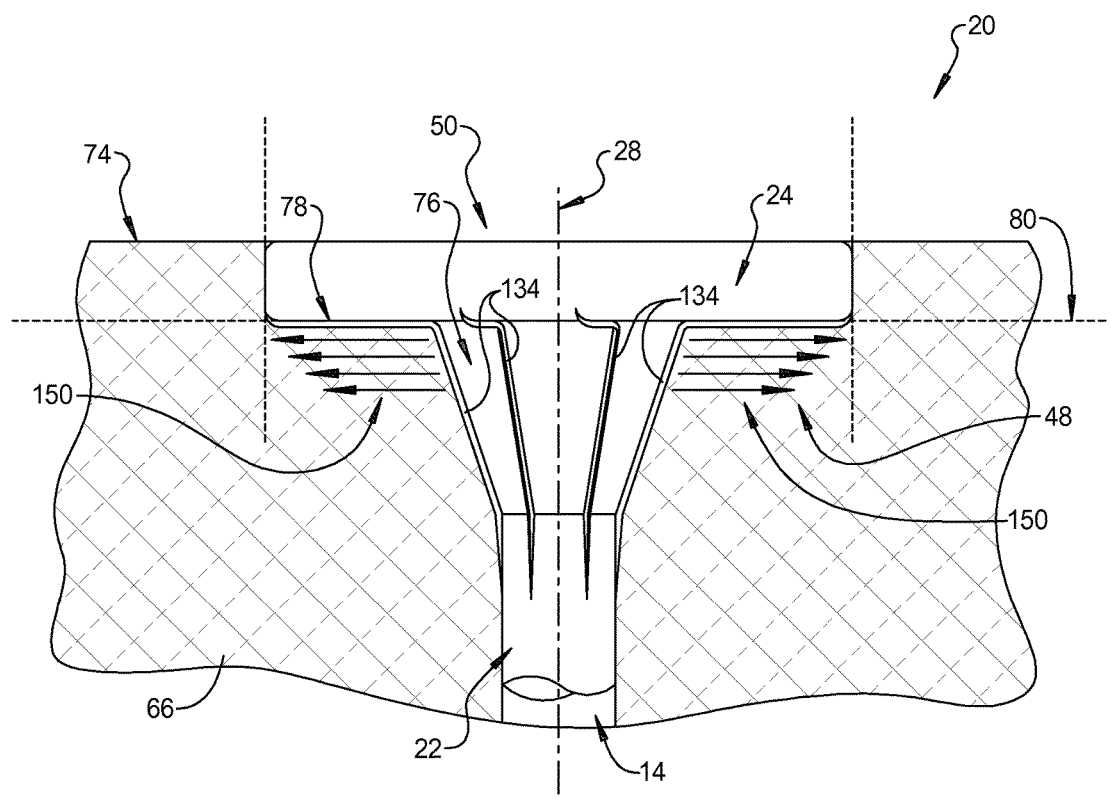
FIG. 14 is a side perspective view of the exemplary enlarged head fastener device illustrated in FIG. 12 where exemplary enlarged head fastener device is shown embedded in a substrate material.

With reference to FIG. 14, the shank 22 and the head 24 of the compression indentation fastener device 20 are movable together between a first impacted position (not shown) and a second impacted position (shown in FIG. 14). It should be appreciated that any number of intermediate positions are possible between the first and second impacted positions. In both of the first and second impacted positions, the shank 22 is disposed in hole H in the substrate material 66, where the shank 22 has entered the substrate material 66 from the first surface 74. The hole H in the substrate material 66 may be created prior to insertion of the shank 22 into the substrate material 66 or alternatively may be created by the tip 26 of the shank 22 when the tip 26 enters and moved through the substrate material 66. In the first impacted position, the reference plane 80 of the bearing surface 78 is aligned with the first surface 74 of the substrate material 66 such that the bearing surface 78 sits flush in contact with the first surface 74 of the substrate material 66. Thus, the head 24 has not yet been driven into the substrate material 66 when the enlarged head fastener device 20 is in the first impacted position. In the second impacted position, which is shown in FIG. 14, the head 24 has been driven completely in the substrate material 66. In this position, the posterior side 50 of the head 24 is aligned with the first surface 74 of the substrate material 66 such that the posterior side 50 of the head 24 is flush with the first surface 74 of the substrate material 66.

The head 24 is made of a rigid material that resists deformation when the shank 22 and the head 24 of the compression indentation fastener device 20 move together from the first impacted position to the second impacted position. The substrate material 66 is softer than the rigid material of the head 24, is a solid as opposed to a liquid, gas, gel, or slurry, and has the geometric form of a board or a sheet. The substrate material 66 may be a fibrous material and may be made of wood or a wood-like material. For example, the substrate material 66 may be selected from a group consisting of: lumber, siding, plywood, fiberboard, and oriented strand board. It should also be appreciated that the substrate material 66 may be comprised of multiple, stacked boards or sheets, including by non-limiting example, lumber, siding, plywood, fiberboard, and oriented strand board. By virtue of the relative hardness of the rigid material forming the head 24 in comparison to the softer substrate material 66, the substrate material 66 yields to the bearing surface 78 and the convergent transition portion 76 as the head 24 is driven into the substrate material 66 towards the second impacted position. As such, the convergent transition portion 76 displaces some of the substrate material 66 surrounding the hole H, strengthening the substrate material 66 to increase pull-through resistance.

Referring to FIGS. 15A-D, another alternative configuration of the enlarged head fastener device 20 is illustrated where the head 24 is offset relative to the second end 32 of the shank 22. As such, this configuration is particularly well suited to collated power driven delivery systems, including by way of non-limiting example, nail-guns. The head 24 has a midpoint 154 that is centrally located along the head cross-section 56 and relative to the head periphery 58. The midpoint 154 is disposed in the transverse plane 46 and is spaced laterally from the shank axis 28 by an offset distance 156. Therefore, it should be appreciated that the head 24 extends further to one side of the shank 22 at greater offset distances 156. The head 24 of the enlarged head fastener device 20 may be elongated in the transverse plane 46. The head 24 defines a lateral axis 162 extending in the transverse plane 46 where the lateral axis 162 passes through the midpoint 154 of the head 24 and interests the shank axis 28. The head 24 has a head length 164 measured parallel to the lateral axis 162 and the head width 60 is measured perpendicular to the lateral axis 162. The head 24 is elongated along the lateral axis 162 such that the head length 164 is greater than the head width 60. Apart from the above noted distinctions, the construction of the enlarged head fastener device 20 shown in FIGS. 15A-D is largely the same as the enlarged head fastener device 20 shown in FIGS. 1, 2, 3A, and 3B.

Figure 16A:
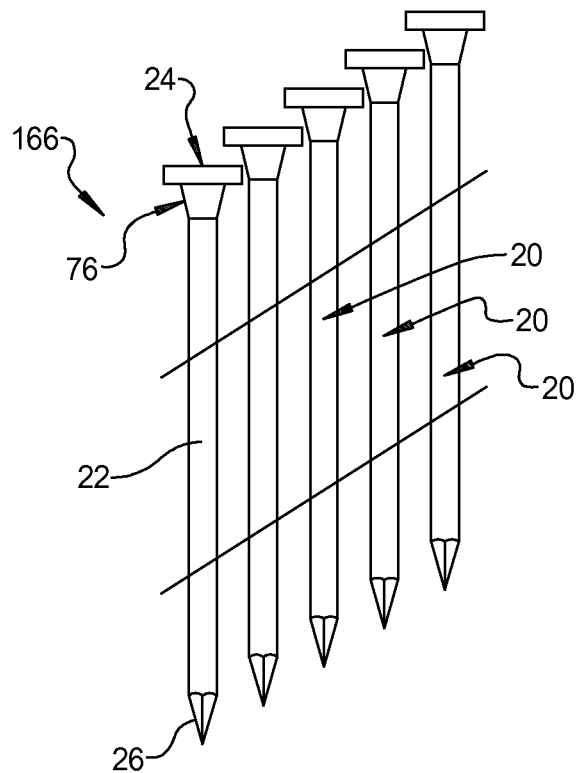
FIG. 16A is a side elevation view of several of the exemplary enlarged head fastener devices illustrated in FIG. 1 that have been collated as part of a string of fasteners.
Figure 16B:
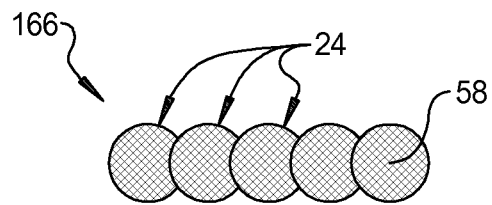
FIG. 16B is a top elevation view of the exemplary enlarged head fastener devices illustrated in FIG. 16A.
Figure 16C:
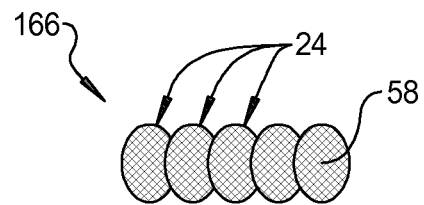
FIG. 16C is a top elevation view of several of the exemplary enlarged head fastener devices illustrated in FIG. 15A that have been collated as part of a string of fasteners.

FIGS. 16A-C illustrate one possible application of the subject enlarged head fastener device 20, where the enlarged head fastener device 20 is in the nail-like configuration and has been adapted for use in a collated power driven delivery system such as a nail-gun. In FIGS. 16A-C, several of the enlarged head fastener devices 20 have been collated and arranged in a string of fasteners 166. In use, this string of fasteners 166 is feed into the collated power driven delivery system. As can be seen in FIGS. 16B and 16C, the heads 24 of the enlarged head fastener devices 20 in the string of fasteners 166 may partially overlap with one another and may have a circular or oval shaped head cross-section 56.

Figure 17:
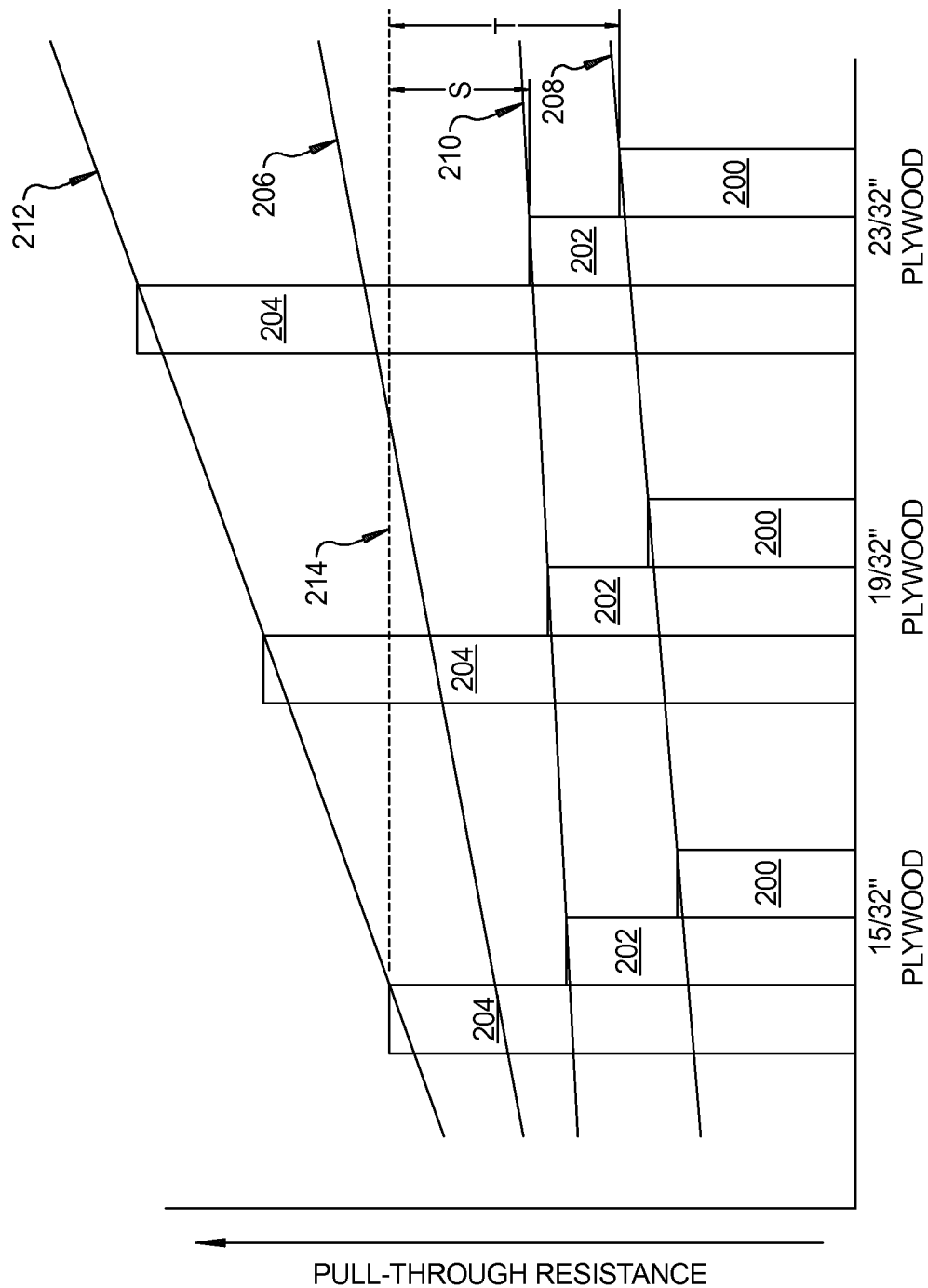
FIG. 17 is a plot comparing the ultimate yield pull-through resistance of small-head fasteners and conventional enlarged head fasteners to the ultimate yield pull-through resistance of the exemplary enlarged head fastener device shown in FIG. 1.

FIG. 17 is a plot comparing the ultimate yield pull-through resistance of the enlarged head fastener device 20 illustrated in FIGS. 1, 2, 3A and 3B to the ultimate yield pull-through resistance of conventional small-head fasteners and conventional enlarged head fasteners. The data illustrated was compiled from third-party independent testing performed by NTA, Inc. In FIG. 17, the ultimate yield pull-though resistance of a small-head fastener is illustrated by bar 200, the ultimate yield pull-through resistance of a conventional enlarged head fastener is illustrated by bar 202, and the ultimate yield pull-through resistance of an enlarged head fastener device 20 constructed in accordance with the subject disclosure is illustrated by bar 204. Each fastener was tested in three different thicknesses of plywood substrate material 66, including 15/32 of an inch, 19/32 of an inch, and 23/32 of an inch. The plot shows that the ultimate yield pull-through resistance of the conventional enlarged head fastener was higher than the ultimate yield pull-through resistance of the small-head fastener for each thickness of substrate material 66 tested. The plot also shows that the ultimate yield pull-through resistance of the enlarged head fastener device 20 described herein was higher than that of both the small-head fastener and the conventional enlarged head fastener for each thickness of substrate material 66 tested. These test results confirm and quantify the improved ultimate yield pull-through resistance of the enlarged head fastener device 20 described herein.

As one would expect, the pull-through resistance of each fastener increased as the thickness of the substrate material 66 was increased. However, somewhat unexpectedly, the pull-through resistance of the small-head fastener and the conventional enlarged head fastener did not increase proportionally with the increase in thickness of the substrate material 66, but increased at a lesser rate. This is likely due to the fact that the planar geometry of the small-head fastener and the conventional enlarged head fastener cuts and/or ruptures the surface fibers of the substrate material 66 once a certain amount of force is applied to the fastener.

In FIG. 17, a first line 206 depicting the increasing thickness of the substrate material 66 is illustrated for reference purposes. A second line 208 depicts the increasing values of ultimate yield pull-through resistance of the small-head fastener and a third line 210 depicts the increasing values of ultimate yield pull-through resistance of the conventional enlarged head fasteners. Finally, the ultimate yield pull-through resistance of the enlarged head fastener device 20 described herein is depicted by a fourth line 212. The second and third lines 208, 210, which correspond to the pull-through performance of the small-head fasteners and the conventional enlarged head fasteners, have slopes that are substantially the same and less than a slope of the first line 206. In other words, the second and third lines 208, 210 are substantially parallel to one another and the second and third lines 208, 210 are less steep than the first line 206, which corresponds to the thickness increase in the substrate material 66. This means that even though the values for ultimate yield pull-through resistance of the conventional enlarged head fastener was greater than the values for ultimate yield pull-through resistance of the small-head fastener, both of the small-head fasteners and the conventional enlarged head fasteners performed similarly to one another in response to increasing the thickness of the substrate material 66. This also means that the increase in the thickness of the substrate material 66 outpaced the values for ultimate yield pull-through resistance of the small-head fasteners and the conventional enlarged head fasteners. In other words, if the thickness of the substrate material 66 is doubled, the ultimate yield pull-through resistance of the small-head fasteners and the conventional enlarged head fasteners would not double, but would increase to a lesser extent.

By contrast, the fourth line 212, which corresponds to the pull-through performance of the enlarged head fastener device 20 described herein, has a slope that is greater than the slope of the first line 206. This means that the values for ultimate yield pull-through resistance of the disclosed enlarged head fastener device 20 outpaced the increase in the thickness of the substrate material 66. In other words, if the thickness of the substrate material 66 is doubled, the ultimate yield pull-through resistance of the disclosed enlarged head fastener device 20 would more than double.

An additional performance advantage is illustrated with reference to horizontal datum line 214, which corresponds to the lowest ultimate yield pull-through resistance value of the disclosed enlarged head fastener device 20 (i.e. the value for the 15/32 of an inch thickness). The highest ultimate yield pull-through resistance value achieved by the conventional enlarged head fastener is less than the horizontal datum line 214, and thus the lowest ultimate yield pull-through resistance value of the disclosed enlarged head fastener device 20, by an offset value S. In similar fashion, the highest ultimate yield pull-through value achieved by the small-head fastener is less than the horizontal datum line 214, and thus the lowest ultimate yield pull-through resistance value of the disclosed enlarged head fastener device 20, by value T. The benefits of the enlarged head fastener device 20 described herein are therefore evident in the plot shown in FIG. 17 because a higher ultimate yield pull-through resistance value can be achieved with the disclosed enlarged head fastener device 20 in the thinner 15/32 of an inch thick substrate material 66 than can be achieved with either of the small-head fastener or the conventional enlarged head fastener in the thicker 23/32 of an inch thick substrate material 66. Therefore, cost savings can be realized by using a thinner, more cost effective substrate material 66 while still realizing improved pull-through resistance. Accordingly, the enlarged head fastener device 20 described above can significantly improve the structural integrity of various structures, including without limitation, wood frame buildings.

Figure 18:
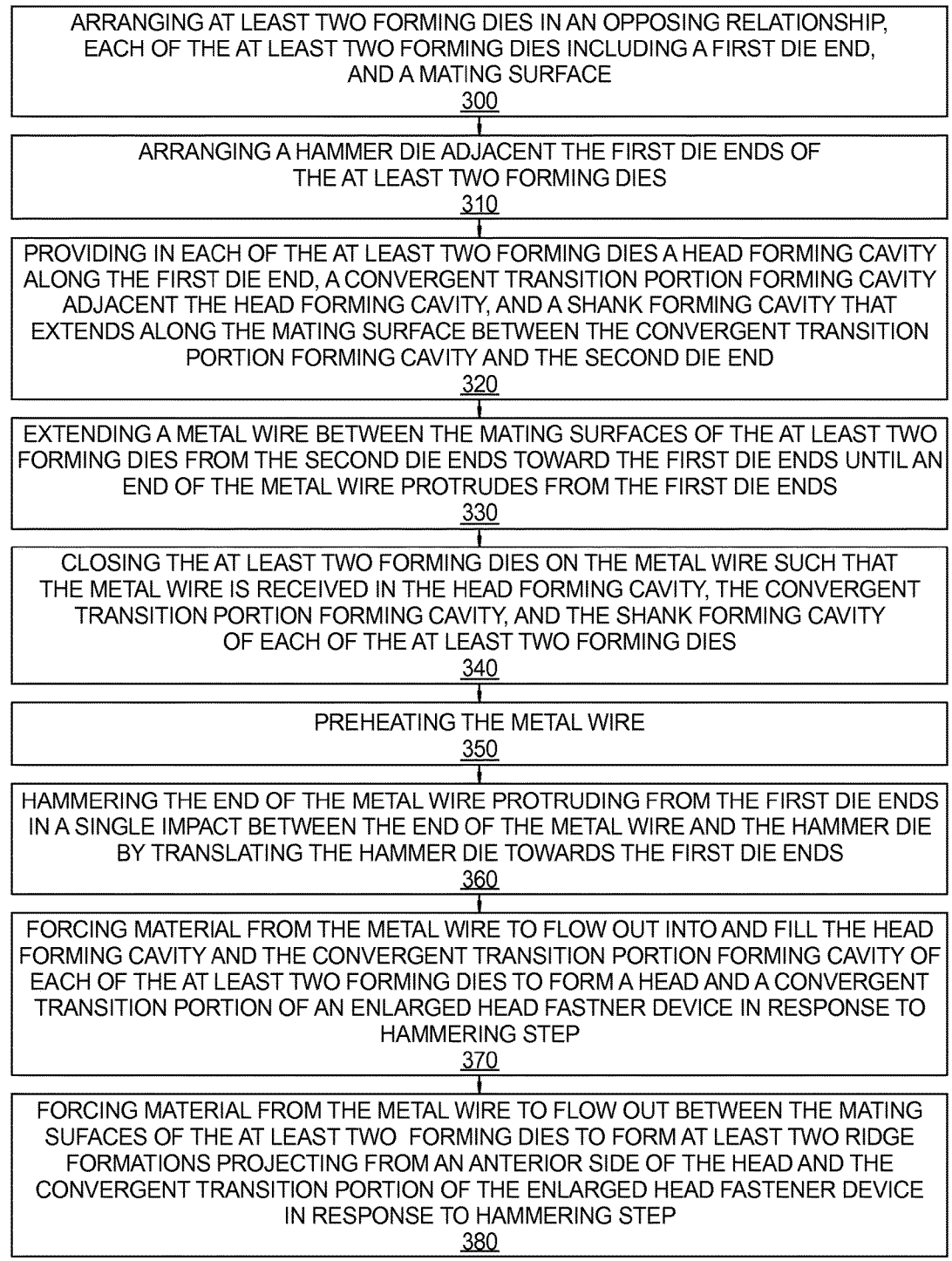
FIG. 18 is a flowchart illustrating an exemplary method of manufacturing an exemplary enlarged head fastener device constructed in accordance with the subject disclosure.
Figure 19:
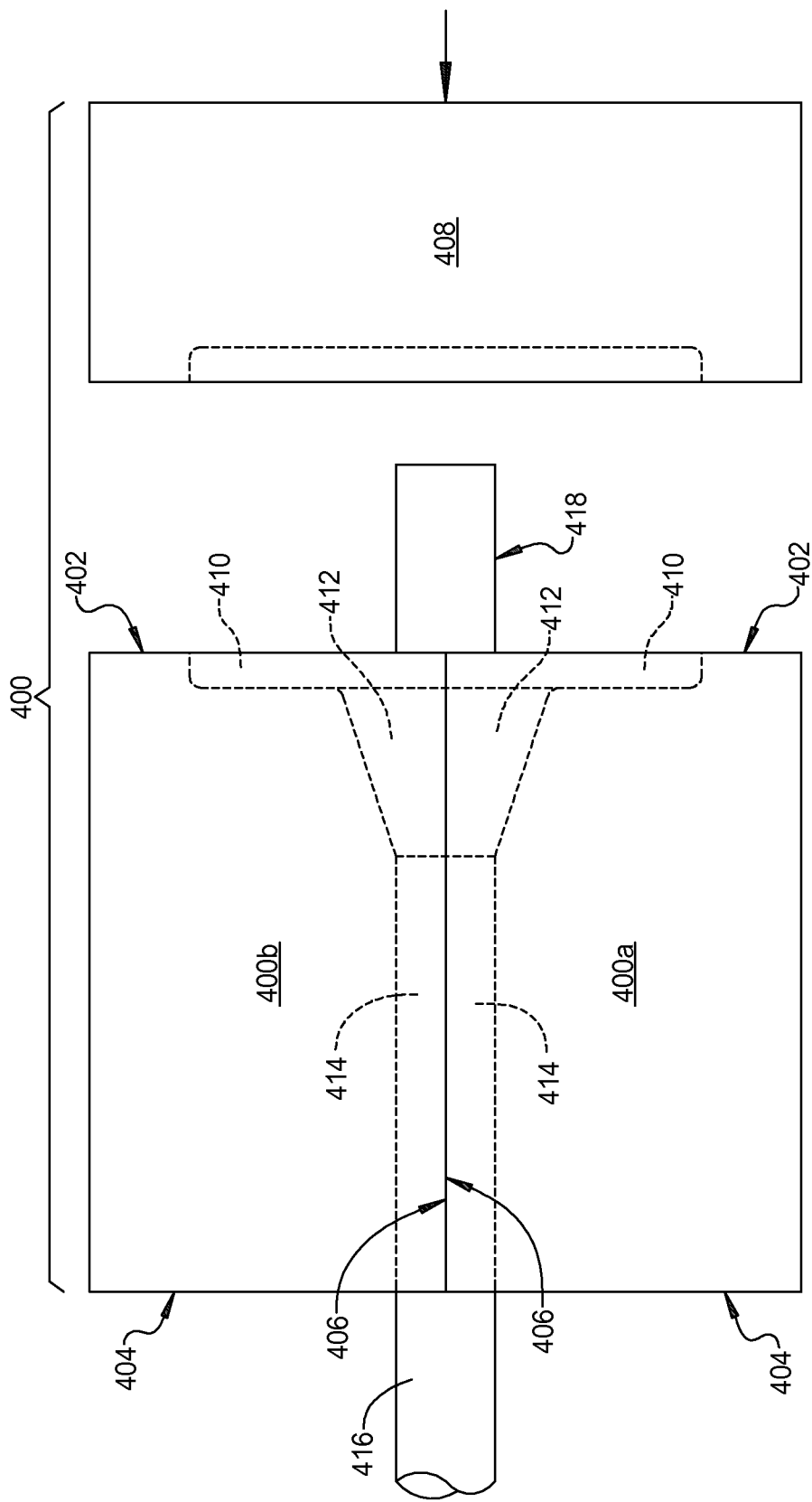
FIG. 19 is a side elevation view of an exemplary die assembly for use in performing the method illustrated in FIG. 18.
Figure 20:
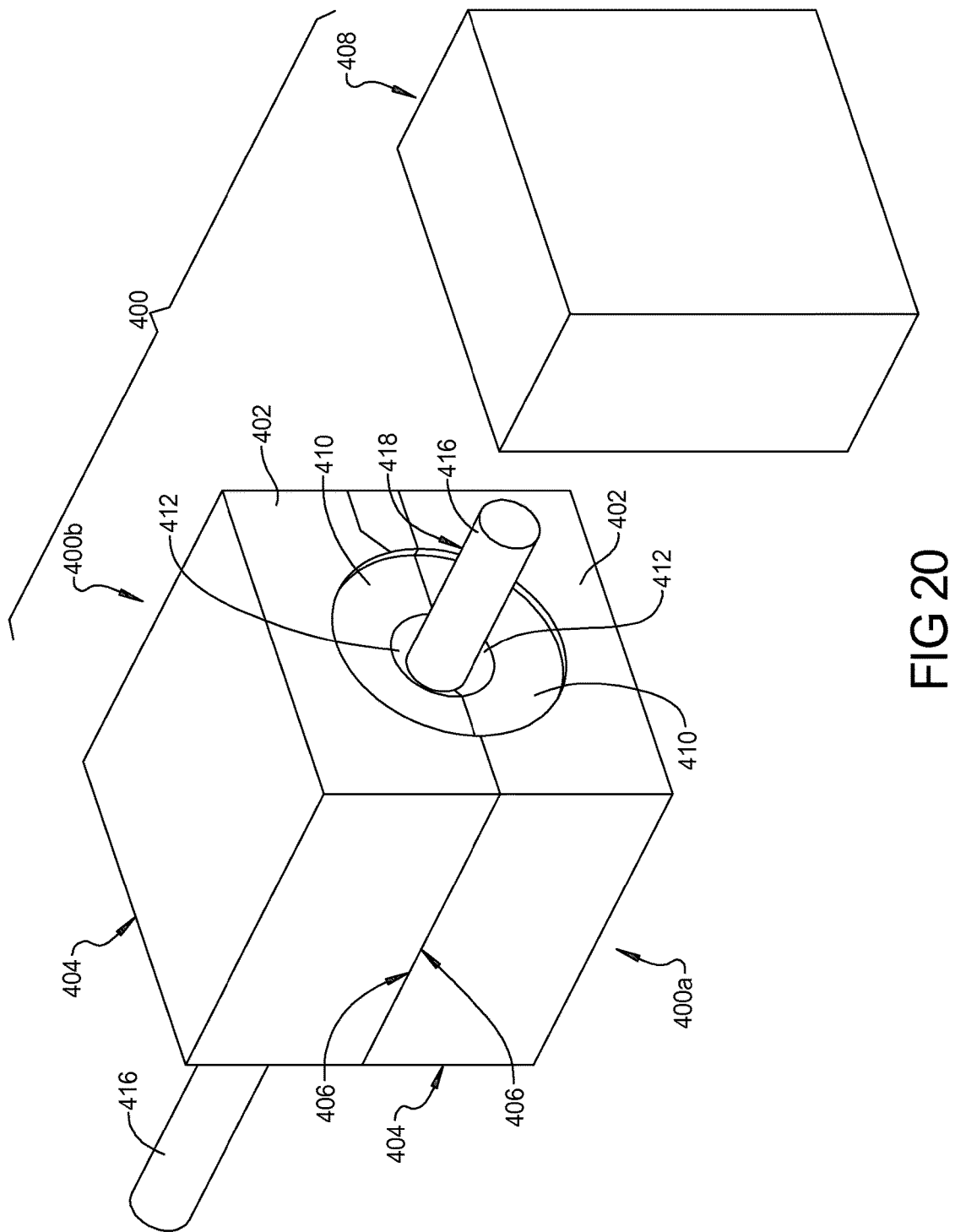
FIG. 20 is a front perspective view of the exemplary die assembly illustrated in FIG. 19.
Figure 21:
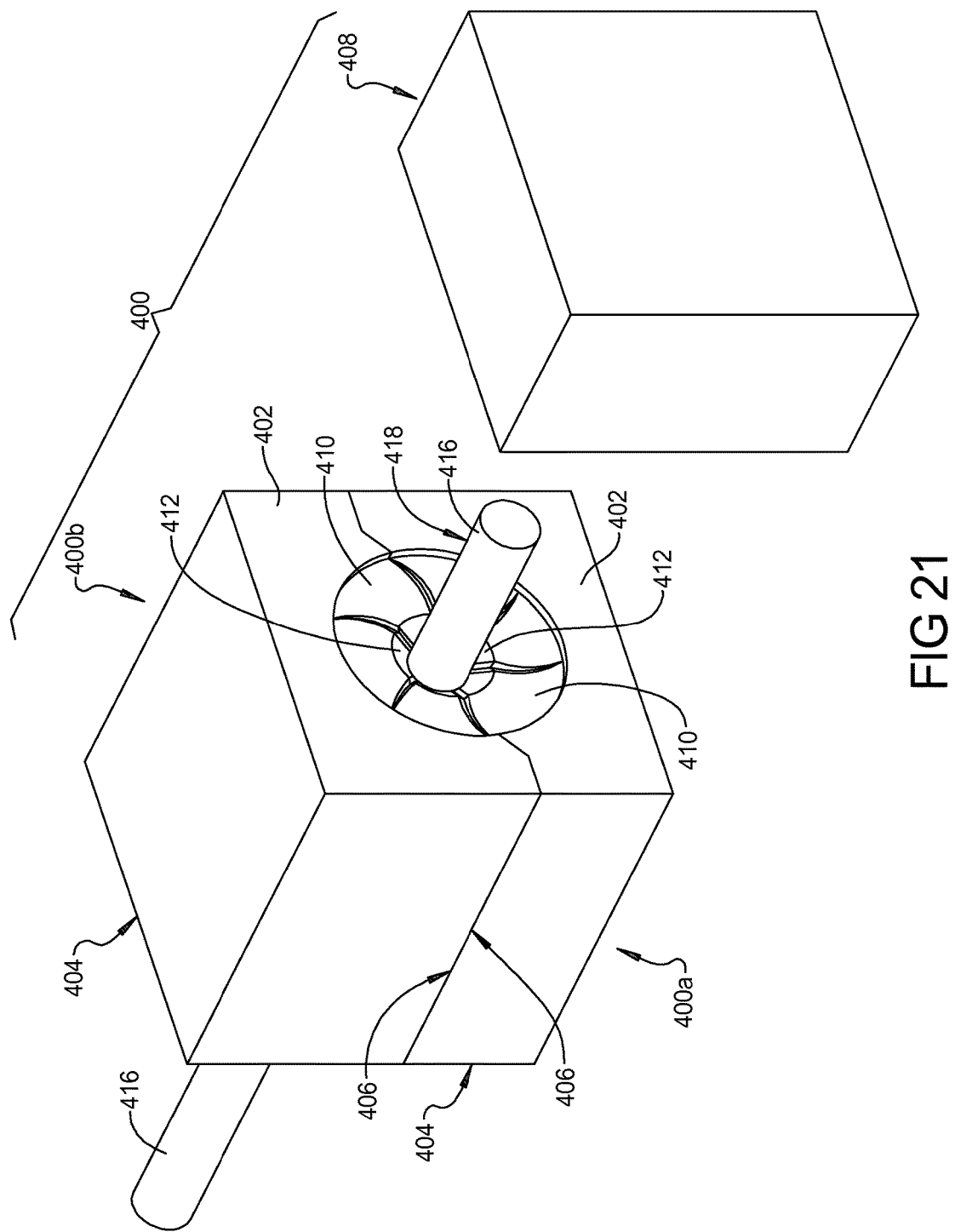
FIG. 21 is a side elevation view of another exemplary die assembly for use in performing the method illustrated in FIG. 18.
Figure 22:
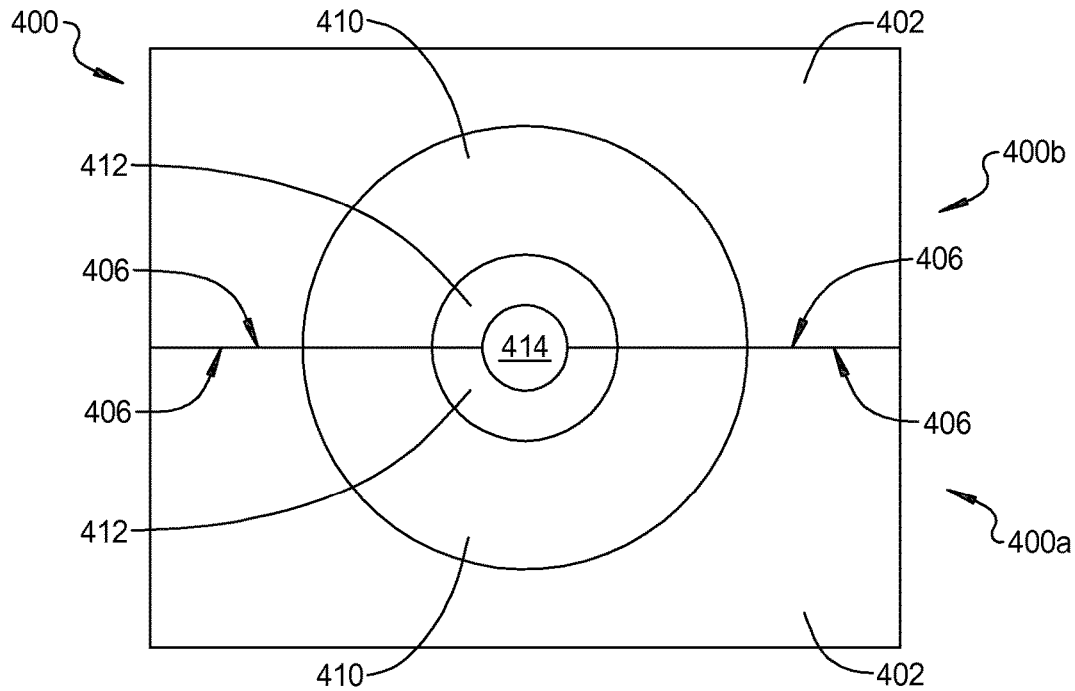
FIG. 22 is a front elevation view of two forming dies of the exemplary die assembly illustrated in FIG. 19.
Figure 23:
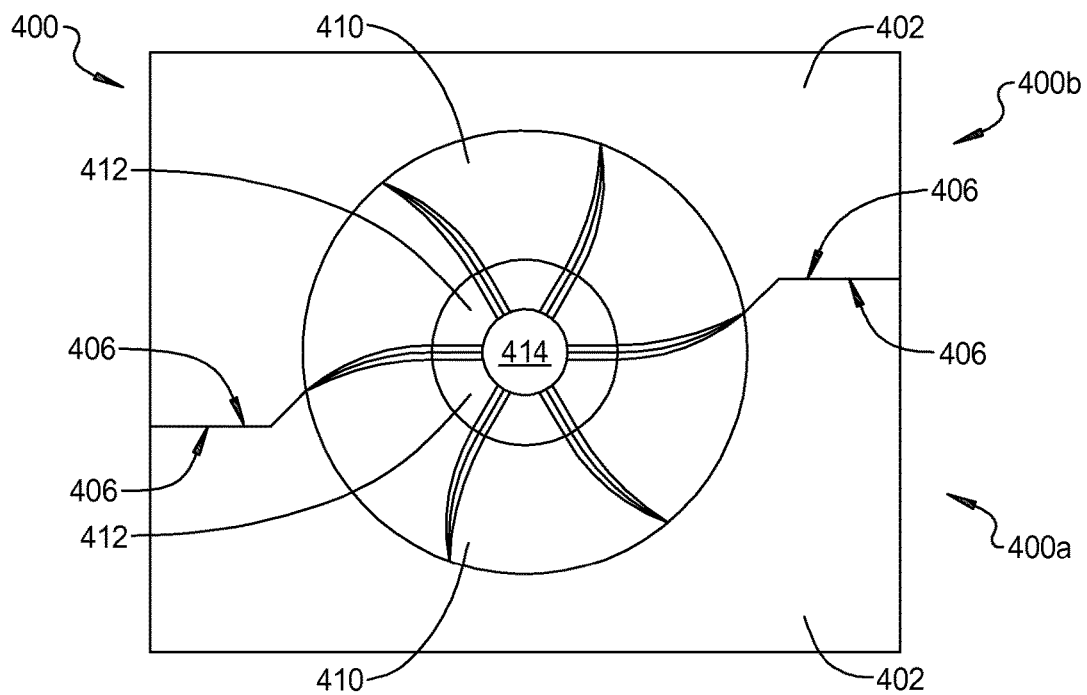
FIG. 23 is a front elevation view of two forming dies of the exemplary die assembly illustrated in FIG. 21.

Now referring to FIG. 18, a method of manufacturing the enlarged head fastener device 20 described above is illustrated. In addition to the flowchart in FIG. 18 that illustrates the steps of the method described herein, further reference is made to FIGS. 19-23, which illustrate the machinery used in performing the method, which includes a die assembly 400. The method includes the step illustrated by block 300 of arranging at least two forming dies 400a, 400b in an opposing relationship. Each of the at least two forming dies 400a, 400b includes a first die end 402, a second die end 404, and a mating surface 406 that extends between the first and second die ends 402, 404. The mating surfaces 406 of the at least two forming dies 400a, 400b oppose one another. The method also includes the steps illustrated by blocks 310 and 320 of arranging a hammer die 408 adjacent the first die ends 402 of the at least two forming dies 400a, 400b and providing in each of the at least two forming dies 400a, 400b a head forming cavity 410, a convergent transition portion forming cavity 412, and a shank forming cavity 414. More specifically, the head forming cavities 410 are provided along the first die ends 402, the convergent transition portion forming cavities 412 are provided adjacent the head forming cavities 410, and the shank forming cavities 414 are provided along the mating surfaces 406 of the at least two forming dies 400a, 400b between the convergent transition portion forming cavities 412 and the second die ends 404. The method further includes the steps illustrated by blocks 330 and 340 of extending a metal wire 416 between the mating surfaces 406 of the at least two forming dies 400a, 400b from the second die ends 404 toward the first die ends 402 until an end 418 of the metal wire 416 protrudes from the first die ends 402 and closing the at least two forming dies 400a, 400b on the metal wire 416. In accordance with the closing step illustrated by block 340, the metal wire 416 is received in the head forming cavity 410, the convergent transition portion forming cavity 412, and the shank forming cavity 414 of each of the at least two forming dies 400a, 400b. Optionally, the method may include the step illustrated by block 350 of preheating the metal wire 416. If the preheating step illustrated by block 350 is not performed, the metal wire 416 may be subjected to cold forming under the disclosed method. The method additionally includes the steps illustrated by blocks 360 and 370 of hammering the end 418 of the metal wire 416 protruding from the first die ends 402 in a single impact and forcing material from the metal wire 416 to flow out into and fill the head forming cavity 410 and the convergent transition portion forming cavity 412 of each of the at least two forming dies 400a, 400b. The single impact in the hammering step illustrated by block 360 occurs between the end 418 of the metal wire 416 and the hammer die 408 when the hammer die 408 is translated (i.e. moved or driven) towards the first die ends 402 of the at least two forming dies 400a, 400b. In accordance with the method, the forcing step illustrated by block 370 forms a head 24 and a convergent transition portion 76 of an enlarged head fastener device 20 in response to the hammering step illustrated by block 360. The method may further include the step illustrated by block 380 of forcing material from the metal wire 416 to flow out between the mating surfaces 406 of the at least two forming dies 400*a*, 400*b* to form at least two ridge formations 134 projecting from an anterior side 48 of the head 24 and the convergent transition portion 76 of the enlarged head fastener device 20 in response to said hammering step illustrated by block 380. In accordance with the forcing step illustrated by block 380, it should be appreciated that the two forming dies 400*a*, 400*b* illustrated in FIGS. 19 and 20 will produce an enlarged head fastener device 20 having two ridge formations 134 that are spaced 180 degrees apart, like the enlarged head fastener device 20 illustrated in FIGS. 9-11. On the other hand, it should be appreciated that the two forming dies 400*a*, 400*b* illustrated in FIGS. 20-23 will produce an enlarged head fastener device 20 having six ridge formations 134 that are spaced 60 degrees apart, like the enlarged head fastener device 20 illustrated in FIGS. 12 and 13 in response to the performance of the forcing step illustrated by block 380.

It should be appreciated that although steps 300-380 of the method are described and illustrated herein in a particular order, steps 300-380 may be performed in a different order without departing from the scope of the present disclosure, except where the order of the steps is otherwise noted.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. An enlarged head fastener device having a nail-like arrangement comprising:
   a shank extending along a shank axis and between a first end and a second end;
   said shank having a shank cross-section that is perpendicular to said shank axis, said shank cross-section having a circular shape and a shank diameter;
   said shank having an exterior surface that extends between said first end and said second end of said shank, wherein said exterior surface of said shank is unthreaded and has a smooth cylindrical shape;
   a head disposed at said second end of said shank, said head extending outwardly from said second end of said shank in a transverse plane that is perpendicular to said shank axis to define a head periphery;
   said head having an anterior side adjacent said second end of said shank and a posterior side opposite said anterior side;
   said anterior side of said head including a bearing surface that extends inwardly from an outer radius edge adjacent said head periphery to an inner radius edge in a first direction that is parallel to said transverse plane; and
   said anterior side of said head including a convergent transition portion that extends inwardly from a large end adjacent said inner radius edge of said bearing surface to a small end adjacent said second end of said shank, said large end of said convergent transition portion having a circular shape and a large end diameter, wherein said large end diameter is 1.25 to 2.05 times larger than said shank diameter such that said convergent transition portion reinforces said head without interfering with installation of said enlarged head fastener device,
   wherein said bearing surface has a bearing surface area that is bounded by said outer radius edge and said inner radius edge, said bearing surface area being at least 9 times larger than said shank cross-section.

2. The enlarged head fastener device set forth in claim 1 wherein said convergent transition portion has an axial length measurable between said large end and said small end of said convergent transition portion in a second direction that is parallel to said shank axis, said axial length of said convergent transition portion being 0.55 to 1.75 times larger than said shank diameter.

3. The enlarged head fastener device set forth in claim 1 wherein said convergent transition portion has an outer surface that extends between said large end and said small end along a convergent transition portion reference line such that said convergent transition portion has a frustoconical shape, said convergent transition portion reference line intersecting said shank axis at a location disposed between said first and second ends of said shank and at angle ranging from 12.5 degrees to 32.5 degrees.

4. The enlarged head fastener device set forth in claim 1 wherein said convergent transition portion has an outer surface that extends between said large end and said small end, said outer surface being curved such that said convergent transition portion is shaped as a parabolic frustum.

5. The enlarged head fastener device set forth in claim 1 wherein said bearing surface defines a reference plane that is substantially parallel to said transverse plane, said head and said shank are integral as part of a one-piece structure and are moveable between a first impacted position and a second impacted position, said reference plane of said bearing surface is aligned with a first surface of a substrate material in said first impacted position, and at least a portion of said head is embedded in the substrate material in said second impacted position.

6. The enlarged head fastener device set forth in claim 5 wherein said convergent transition portion is integral with said head and said shank such that said convergent transition portion resists deformation of said head relative to said second end of said shank when said head and said shank move from said first impacted position to said second impacted position.

7. The enlarged head fastener device set forth in claim 5 wherein said outer radius edge of said bearing surface is rounded and provides a smooth transition between said bearing surface and said head periphery to prevent surface fibers at the first surface of the substrate material from becoming cut as said head and said shank move from said first impacted position to said second impacted position.

8. The enlarged head fastener device set forth in claim 1 wherein said convergent transition portion has an outer surface that extends between said large end and said small end, said outer surface having one or more teeth that have an annular shape and an outside diameter that increases moving from said small end to said large end of said convergent transition portion to give said one or more teeth a ramp-like profile that tapers to a sharp edge.

9. The enlarged head fastener device set forth in claim 1 wherein said head is offset relative to said second end of said shank.

10. The enlarged head fastener device set forth in claim 9 wherein said head includes a midpoint that is centrally located within said head relative to said head periphery, said midpoint being disposed in said transverse plane and spaced along laterally from said shank axis by an offset distance.

11. The enlarged head fastener device set forth in claim 10 wherein said head defines a lateral axis extending in said transverse plane that interests said shank axis and passes through said midpoint, wherein said head has a head length measured parallel to said lateral axis and a head width measured perpendicular to said lateral axis, and wherein said head is elongated along said lateral axis such that said head length is greater than said head width.

12. The enlarged head fastener device set forth in claim 1 wherein said bearing surface has a planar, ring-like shape.

13. An enlarged head fastener device having a nail-like arrangement comprising:
a shank extending along a shank axis and between a first end and a second end;
said shank having an exterior surface that extends between said first end and said second end of said shank, wherein said exterior surface of said shank is unthreaded and has a smooth cylindrical shape;
a head disposed at said second end of said shank, said head extending outwardly from said second end of said shank in a transverse plane that is substantially perpendicular to said shank axis to define a head periphery;
said head having an anterior side adjacent said second end of said shank and a posterior side opposite said anterior side, said posterior side of said head being configured to be driven by a tool; and
at least one ridge formation disposed on and projecting from said anterior side of said head for reinforcing said head, said at least one ridge formation extending continuously between an outboard end positioned on said anterior side of said head adjacent said head periphery and an inboard end that is closer to said second end of said shank than said outboard end,
wherein said anterior side of said head includes a bearing surface and a convergent transition portion, said bearing surface extending inwardly from an outer radius edge adjacent said head periphery to an inner radius edge, said convergent transition portion extending inwardly from a large end adjacent said inner radius edge of said bearing surface to a small end adjacent said second end of said shank, said convergent transition portion having an outer surface that extends between said large end and said small end, and said at least one ridge formation extending across at least part of said outer surface of said convergent transition portion,
wherein said at least one ridge formation extends across said outer surface of said convergent transition portion in a straight line between said large end and said small end and wherein said at least one ridge formation extends across said bearing surface in a curved line between said inner radius edge and said outer radius edge.

14. The enlarged head fastener device set forth in claim 13 wherein said inboard end of said at least one ridge formation is positioned on said exterior surface of said shank adjacent said second end of said shank.

15. The enlarged head fastener device set forth in claim 13 wherein said at least one ridge formation is peaked reinforcement rib and has a cross-sectional profile with a triangular shape.

16. The enlarged head fastener device set forth in claim 13 wherein said at least one ridge formation includes multiple ridge formations that are evenly spaced about said anterior side of said head.

17. The enlarged head fastener device set forth in claim 13 wherein said head has a head cross-section that extends perpendicularly relative to said shank axis, said head cross-section having a circular or oval shape.

18. An enlarged head fastener device having a nail-like arrangement comprising:
a shank extending along a shank axis and between a first end and a second end;
said shank having an exterior surface that extends between said first end and said second end of said shank, wherein said exterior surface of said shank is unthreaded and has a smooth cylindrical shape;
a head disposed at said second end of said shank, said head extending outwardly from said second end of said shank in a transverse plane that is substantially perpendicular to said shank axis to define a head periphery;
said head having an anterior side adjacent said second end of said shank and a posterior side opposite said anterior side, said posterior side of said head being configured to be driven by a tool; and
at least one ridge formation disposed on and projecting from said anterior side of said head for reinforcing said head, said at least one ridge formation extending continuously between an outboard end positioned on said anterior side of said head adjacent said head periphery and an inboard end that is closer to said second end of said shank than said outboard end,
wherein said at least one ridge formation is a round reinforcement rib and has a cross-sectional profile with a semi-circular shape.

19. The enlarged head fastener device set forth in claim 18 wherein said at least one ridge formation extends linearly across said anterior side of said head between said second end of said shank and said head periphery.

* * * * *